(12) United States Patent
Yang et al.

(10) Patent No.: US 11,874,571 B2
(45) Date of Patent: Jan. 16, 2024

(54) DISPLAY PANEL AND DISPLAY APPARATUS

(71) Applicant: Xiamen Tianma Micro-Electronics Co., Ltd., Xiamen (CN)

(72) Inventors: Yan Yang, Xiamen (CN); Ting Zhou, Xiamen (CN); Wenqi Zhou, Xiamen (CN); Junyi Li, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 17/703,517

(22) Filed: Mar. 24, 2022

(65) Prior Publication Data

US 2023/0213824 A1 Jul. 6, 2023

(30) Foreign Application Priority Data

Dec. 31, 2021 (CN) .......................... 202111664000.8

(51) Int. Cl.
| | |
|---|---|
| *G02F 1/1362* | (2006.01) |
| *G02F 1/1335* | (2006.01) |
| *G02F 1/1343* | (2006.01) |
| *G02F 1/1368* | (2006.01) |

(52) U.S. Cl.
CPC .. *G02F 1/136209* (2013.01); *G02F 1/133512* (2013.01); *G02F 1/133514* (2013.01); *G02F 1/134345* (2021.01); *G02F 1/13685* (2021.01); *G02F 1/134363* (2013.01)

(58) Field of Classification Search
None
See application file for complete search history.

(56) References Cited

U.S. PATENT DOCUMENTS

| | | | | |
|---|---|---|---|---|
| 2015/0227013 A1* | 8/2015 | Hao | .................. | G02F 1/136286 257/72 |
| 2019/0179197 A1* | 6/2019 | Li | ..................... | G02F 1/133528 |
| 2019/0302548 A1* | 10/2019 | Lee | ................... | G02F 1/133514 |
| 2019/0317343 A1* | 10/2019 | Li | ............................ | G09G 3/36 |

FOREIGN PATENT DOCUMENTS

| | | | | | |
|---|---|---|---|---|---|
| CN | 103091883 | A | | 5/2013 | |
| CN | 109100881 | A | * | 12/2018 | ........... G02F 1/1323 |
| CN | 110082969 | A | * | 8/2019 | ........... G02F 1/1323 |
| CN | 110349509 | A | | 10/2019 | |

\* cited by examiner

*Primary Examiner* — Shan Liu

(74) *Attorney, Agent, or Firm* — Anova Law Group, PLLC

(57) ABSTRACT

A display panel and a display apparatus are provided in the present disclosure. The display panel includes a plurality of pixel units, where the pixel unit at least includes a color pixel region and a highlighted pixel region. A side of the first substrate facing the second substrate includes a first light-blocking layer, and a side of the second substrate facing the first substrate includes a second light-blocking layer and a color-resist layer. A first light-blocking portion at least includes a first opening and a first sub-portion; and a second light-blocking portion at least includes a second sub-portion and a second opening. An orthographic projection of the second opening onto the first substrate overlaps an orthographic projection of the first sub-portion onto the first substrate; and an orthographic projection of the first opening onto the first substrate overlaps an orthographic projection of the second sub-portion onto the first substrate.

20 Claims, 35 Drawing Sheets

DISPLAY PANEL AND DISPLAY APPARATUS

CROSS-REFERENCE TO RELATED APPLICATION

This application claims the priority of Chinese Patent Application No. 202111664000.8, filed on Dec. 31, 2021, the content of which is incorporated herein by reference in its entirety.

TECHNICAL FIELD

The present disclosure generally relates to the field of display technology and, more particularly, relates to a display panel and a display apparatus.

BACKGROUND

With continuous development of display technology, requirements for display manners become more diverse, and users' awareness of personal privacy protection become stronger. More scenarios require display apparatuses to have anti-peep function. For example, in business display field, display requirements such as portability, anti-peep function, high color gamut and high contrast are put forward. Therefore, anti-peep display technology, as a privacy protection manner, has become one of the important issues in the display field.

In the existing technology, to satisfy the anti-peep function, various solutions have been developed. For example, a switchable anti-peep filter may be used. The anti-peep filter is made of a polymer material or an inorganic material, and the anti-peep switch is realized by switching the light transmittance of the anti-peep filter through an electric drive manner. However, the filter needs to be configured with a relatively thick substrate to block the light from the side viewing angle, while the polymer material or inorganic material with a large thickness causes a large light loss, therefore causing low display brightness problem. For another example, a liquid crystal grating may be used. The combined structure of the liquid crystal grating and the display panel is used to realize the anti-peep effect at the invisible anti-peep region. However, since the liquid crystal grating needs to block certain pixels of the display panel to block the side viewing angle, it not only reduces the transmittance and causes relatively large overall brightness loss, and easily cause reduced display resolution and relatively large display picture loss. For another example, an anti-peep switch apparatus or a switchable backlight structure design is additionally configured; however, such design is likely to result in a complex display structure with a relatively thick thickness, and higher requirements are needed for the apparatus processing technology.

Therefore, there is a need to provide a display panel and a display apparatus that can achieve anti-peep effect, reduce display brightness loss, and improve display quality and user satisfaction.

SUMMARY

One aspect of the present disclosure provides a display panel. The display panel includes a plurality of pixel units, where a pixel unit of the plurality of pixel units at least includes a color pixel region and a highlighted pixel region; and a first substrate and a second substrate, which are oppositely disposed. A side of the first substrate facing the second substrate includes a first light-blocking layer, and a side of the second substrate facing the first substrate includes a second light-blocking layer and a color-resist layer. In the highlighted pixel region, the first light-blocking layer includes a first light-blocking portion at least including a first opening and a first sub-portion; and the second light-blocking layer includes a second light-blocking portion at least including a second sub-portion and a second opening. An orthographic projection of the second opening onto the first substrate overlaps an orthographic projection of the first sub-portion onto the first substrate; and an orthographic projection of the first opening onto the first substrate overlaps an orthographic projection of the second sub-portion onto the first substrate.

Another aspect of the present disclosure provides a display apparatus including a display panel. The display panel includes a plurality of pixel units, where a pixel unit of the plurality of pixel units at least includes a color pixel region and a highlighted pixel region; and a first substrate and a second substrate, which are oppositely disposed. A side of the first substrate facing the second substrate includes a first light-blocking layer, and a side of the second substrate facing the first substrate includes a second light-blocking layer and a color-resist layer. In the highlighted pixel region, the first light-blocking layer includes a first light-blocking portion at least including a first opening and a first sub-portion; and the second light-blocking layer includes a second light-blocking portion at least including a second sub-portion and a second opening. An orthographic projection of the second opening onto the first substrate overlaps an orthographic projection of the first sub-portion onto the first substrate; and an orthographic projection of the first opening onto the first substrate overlaps an orthographic projection of the second sub-portion onto the first substrate.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated into a part of the specification, illustrate embodiments of the present disclosure and together with the description to explain the principles of the present disclosure.

DETAILED DESCRIPTION

Figure 1:
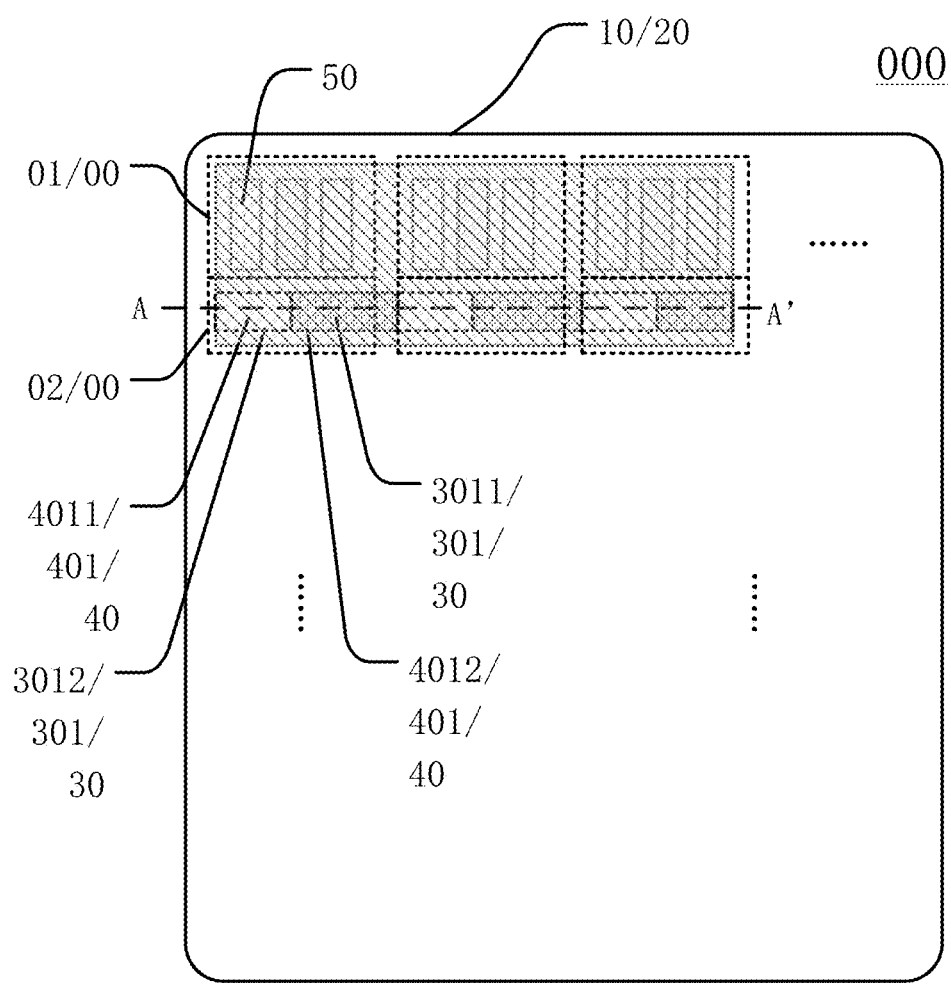
FIG. 1 illustrates a plan structural schematic of an exemplary display panel according to various embodiments of the present disclosure.

Various exemplary embodiments of the present disclosure are be described in detail with reference to the accompanying drawings. It should be noted that unless specifically stated otherwise, the relative arrangement of components and steps, numerical expressions and numerical values described in these embodiments may not limit the scope of the present disclosure.

The following description of at least one exemplary embodiment may be merely illustrative and may not be used to limit the present disclosure and its application or use.

The technologies, methods, and apparatuses known to those skilled in the art may not be discussed in detail, but where appropriate, the technologies, methods, and apparatuses should be regarded as a part of the present disclosure.

In all examples shown and discussed herein, any specific value should be interpreted as merely exemplary, rather than as a limitation. Therefore, other examples of the exemplary embodiment may have different values.

It should be noted that similar reference numerals and letters indicate similar items in the following drawings. Therefore, once an item is defined in one drawing, it does not need to be further discussed in the subsequent drawings.

Figure 2:
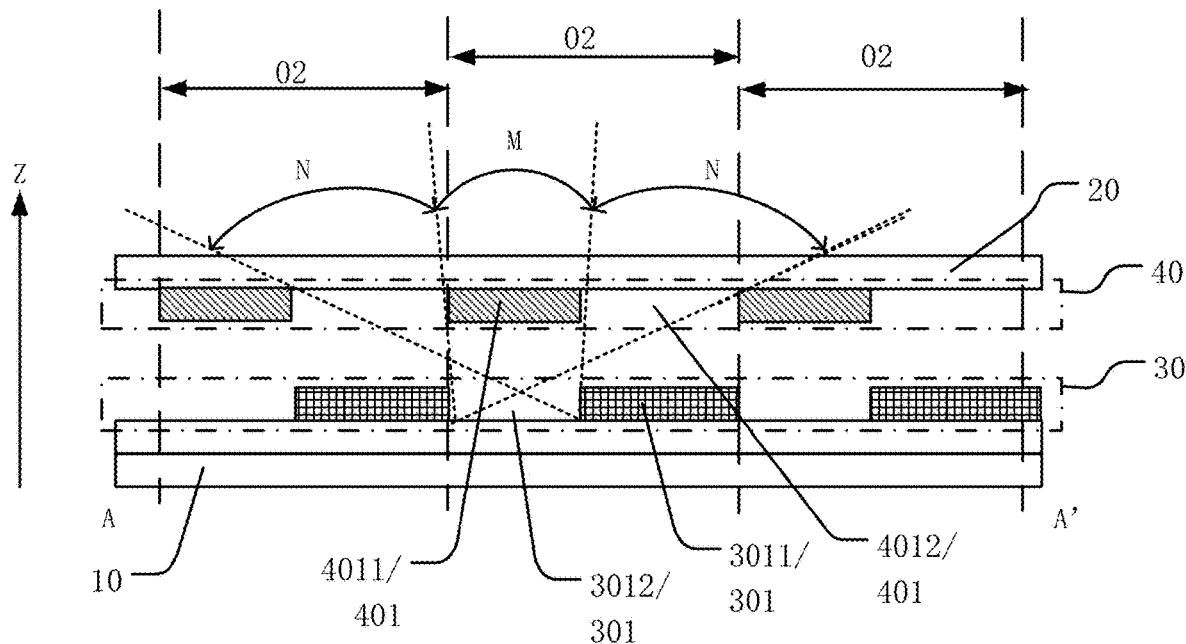
FIG. 2 illustrates a cross-sectional structural schematic along a A-A' direction in FIG. 1.
Figure 3:
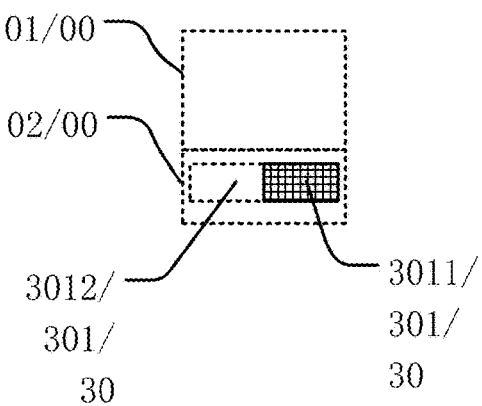
FIG. 3 illustrates a structural schematic of a first light-blocking layer and a color-resist layer within a range of a pixel unit in FIG. 1.
Figure 4:
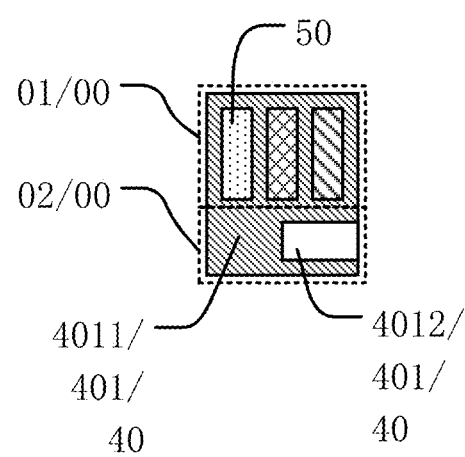
FIG. 4 illustrates a structural schematic of a second light-blocking layer within a range of a pixel unit in FIG. 1.

Referring to FIGS. 1-4, FIG. 1 illustrates a plan structural schematic of an exemplary display panel according to various embodiments of the present disclosure; FIG. 2 illustrates a cross-sectional structural schematic along a A-A' direction in FIG. 1; FIG. 3 illustrates a structural schematic of a first light-blocking layer and a color-resist layer within a range of a pixel unit in FIG. 1; and FIG. 4 illustrates a structural schematic of a second light-blocking layer within the range of the pixel unit in FIG. 1 (it can be understood that, to clearly illustrate the structure in one embodiment, transparency fill may be performed in FIG. 1). A display panel 000 provided in one embodiment may include a plurality of pixel units 00, where the pixel unit 00 may at least include one color pixel region 01 and one highlighted pixel region 02.

The display panel 000 may further include the first substrate 10 and the second substrate 20, which are oppositely disposed. The side of the first substrate 10 facing the second substrate 20 may include the first light-blocking layer 30, and the side of the second substrate 20 facing the first substrate 10 may include the second light-blocking layer 40 and a color-resist layer 50.

In the highlighted pixel region 02, the first light-blocking layer 30 may include a first light-blocking portion 301; and the first light-blocking portion 301 may at least include a first opening 3012 and a first sub-portion 301. The second light-blocking layer 40 may include a second light-blocking portion 401; and the second light-blocking portion 401 may at least include a second sub-portion 4011 and a second opening 4012.

The orthographic projection of the second opening 4012 onto the first substrate 10 may overlap the orthographic projection of the first sub-portion 3011 onto the first substrate 10; and the orthographic projection of the first opening 3012 onto the first substrate 10 may overlap the orthographic projection of the second sub-portion 4011 onto the first substrate 10.

For example, the display panel 000 provided in one embodiment may include the plurality of pixel units 00. Optionally, the plurality of pixel units 00 may be arranged in an array; or the plurality of pixel units 00 may also be arranged in other manners which may not be limited in one embodiment and may be configured according to the display requirement of the display panel during an implementation. The pixel unit 00 in one embodiment may at least include a color pixel region 01 and a highlighted pixel region 02, where the color pixel region 01 may be used for the display panel 000 to implement color picture display. Optionally, the display panel 000 of the color pixel region 01 may include a structure capable of implementing the display effect in the existing technology. For example, in the color pixel region 01, the side of the first substrate 10 may include pixel electrodes, and the side of the second substrate 20 may include color-resists, and the like (not shown in FIGS. 1-4), which may not be described in detail in one embodiment.

The display panel 000 in one embodiment may be a liquid crystal display panel, and the film layer structure of the display panel 000 may include the first substrate 10 and the second substrate 20 which are oppositely disposed opposite. Optionally, the first substrate 10 may be an array substrate disposed with drive circuits such as transistor arrays and the like; and the second substrate 20 may be a color filter substrate disposed with structures such as color color-resists and the like. When the display panel 000 is a liquid crystal display panel, a liquid crystal layer may also be included between the first substrate 10 and the second substrate 20. When the display panel 000 is a liquid crystal display panel, the display panel 000 itself may not emit light. The rotation of the liquid crystal molecules in the liquid crystal layer between the first substrate 10 and the second substrate 20 may be mainly controlled by applying a driving voltage on the first substrate 10 and the second substrate 20, thereby changing the polarization state of the light of the backlight module; the polarizing plate arranged outside the liquid crystal display panel may be disposed to achieve the transmission and blocking of the light path to control the light transmission amount; and finally, the light from the backlight module may be refracted to generate display images.

In one embodiment, the side of the first substrate 10 facing the second substrate 20 may include the first light-blocking layer 30. The first light-blocking layer 20 may be made of an insulating and light-blocking material, such as a black matrix material commonly used in display panels. For example, the main components of conventional black matrix materials may include carbon black, dispersant, alkali-soluble resin (polymer), monomer, photo-initiator, additives, and the like. Regular black matrix materials may also be referred to as black matrix colloids (BM colloids). It can be understood that the materials of the black matrix in one embodiment may include, but not be limited to, the above-mentioned materials, and may be other insulating and light-blocking materials during an implementation, which may not be described in detail in one embodiment. In the range of the highlighted pixel region 02, the first light-blocking layer 30 may include the first light-blocking portion 301. Optionally, one first light-blocking portion 301 may correspond to one highlighted pixel region 02, and the first light-blocking portion 301 may at least include one first opening 3012 and one first sub-portion 3011. The first opening 3012 may be understood as a hollow structure formed on the first light-blocking layer 30. The first opening 3012 may pass through the first light-blocking layer 30 along the direction Z perpendicular to the light-exiting surface of the display panel 000. The first sub-portion 3011 may be understood as a portion of the first light-blocking layer 30 having insulating and light-blocking material.

In one embodiment, the side of the second substrate 20 facing the first substrate 10 may include the second light-blocking layer 40 and the color-resist layer 50. If the second substrate 20 is a color filter substrate, the second light-blocking layer 40 disposed on the side of the second substrate 20 facing the first substrate 10 may be a black matrix layer in the display panel 000; and the color-resist layer 50 may be a film layer where the color color-resists are located. Within the range of the highlighted pixel region 02, the second light-blocking layer 40 may include the second light-blocking portion 401. Optionally, one second light-blocking portion 401 may correspond to one highlighted pixel region 02, and the second light-blocking portion 401 may at least include one second sub-portion 4011 and one second opening 4012. The second opening 4012 may be understood as a hollow structure formed on the second light-blocking layer 40; and the second opening 4012 may pass through the second light-blocking layer 40 along the direction Z perpendicular to the light-exiting surface of the display panel 000. The second sub-portion 4011 may be understood as a portion of the second light-blocking layer 40 having insulating and light-blocking material.

In one embodiment, within the range of the highlighted pixel region 02, the orthographic projection of the second opening 4012 onto the first substrate 10 may overlap the orthographic projection of the first sub-portion 3011 onto the first substrate 10. Optionally, the orthographic projection of the second opening 4012 onto the first substrate 10 may at least partially overlap the orthographic projection of the first sub-portion 3011 onto the first substrate 10. That is, along the direction Z perpendicular to the light-exiting surface of the display panel, the first sub-portion 3011 with light-blocking function may be disposed under the second opening 4012, which is formed on one side of the second substrate 20, and on one side of the first substrate 10. The orthographic projection of the first opening 3012 onto the first substrate 10 may overlap the orthographic projection of the second sub-portion 4011 onto the first substrate 10. Optionally, the orthographic projection of the first opening 3012 onto the first substrate 10 may at least partially overlap the orthographic projection of the second sub-portion 4011 onto the first substrate 10. That is, along the direction Z perpendicular to the light-exiting surface of the display panel, the second sub-portion 4011 with light-blocking function may be disposed above the first opening 3012, which is formed on the side of the first substrate 10, and on the side of the second substrate 20.

When the user views the display panel 000 on the side of the light-exiting surface of the display panel 000, if it is viewed within the range of the front viewing angle, for example, viewed with the range of the viewing angle M in FIG. 2, the second opening 4012 formed on the side of the second substrate 20 is blocked by the first sub-portion 3011 which is below the second opening and on the side of the first substrate 10; and the first opening 3012 formed on the side of the first substrate 10 is blocked by the second sub-portion 4011 which is above the first opening and on the side of the second substrate 20. Therefore, the light may not transmit the highlighted pixel region 02, and the color pixel region 01 may be provided with a backlight source by the backlight module (not shown in FIGS. 1-4), thereby implementing that normal display pictures may be viewed from the front viewing angle. If it is viewed within the range of the oblique viewing angle, for example, viewed with the range of the viewing angle N in FIG. 2, oblique light leakage may be within the range of the highlighted pixel region 02. Since the highlighted pixel region 02 has high brightness and high transmittance, optionally, pixel electrodes may be disposed on the first substrate 10 of the highlighted pixel region 02, and corresponding structures such as a highlighted color-resists and the like for implementing high transmittance may be disposed on the second substrate 20 of the highlighted pixel region 02 (not shown in FIGS. 1-4), which may not be limited in one embodiment herein and may only need to meet the requirement that the light leakage is in the highlighted pixel region 02 at the oblique viewing angle. Therefore, the viewer may view a white picture in an oblique direction, such that the display panel 000 is white when being viewed from the oblique viewing angle, thereby implementing the anti-peep function.

In one embodiment, only a part of the pixel unit 00 may be configured as the highlighted pixel region 02, and the first light-blocking layer 30 on the side of the first substrate 10 and the second light-blocking layer 40 on the side of the second substrate 20 may be cooperatively arranged, which may implement the objective of being able to watch normal display pictures at the front viewing angle and have the on-state anti-peep function at the oblique viewing angle. The display panel 000 provided in one embodiment may not need to be configured with an anti-peep film or other anti-peep structures to implement the anti-peep function from the oblique viewing angle. Therefore, when the pictures are displayed normally, the brightness loss may be small, which is beneficial for improving the display quality and user satisfaction.

It can be understood that, in the display panel 000 of one embodiment, the highlighted pixel region 02 and the color pixel region 01 may be jointly controlled. That is, when the display panel 000 is turned on for displaying pictures, the structure of the highlighted pixel region 02 may also be in an operating state, only the light may be blocked at the front viewing angle, and the light may not transmit the highlighted pixel region 02 at the front viewing angle. The viewer may only need to adjust the viewing angle, such as viewing from an oblique angle, and may view the oblique light leakage in the highlighted pixel region 02. That is, the viewer may view on-state (e.g., white) pictures, thereby achieving the anti-peep effect.

It should be noted that the display panel 000 in one embodiment may include, but not be limited to, the above-mentioned structures, and may also include other structures capable of implementing display functions, such as pixel electrodes, thin film transistors, signal lines for providing drive signals for the pixel units 00 within the range of the pixel units 00, which, for example, may be understood with reference to the structure of the display panel in the existing technology. The structures may only need to satisfy that the color pixel region 01 in one embodiment may display color pictures, the highlighted pixel region 02 may have high transmittance and high brightness at the oblique viewing angle, and the highlighted pixel region 02 may be in a highlighted white at the oblique viewing angle, which may not be described in detail in one embodiment herein.

Figure 5:
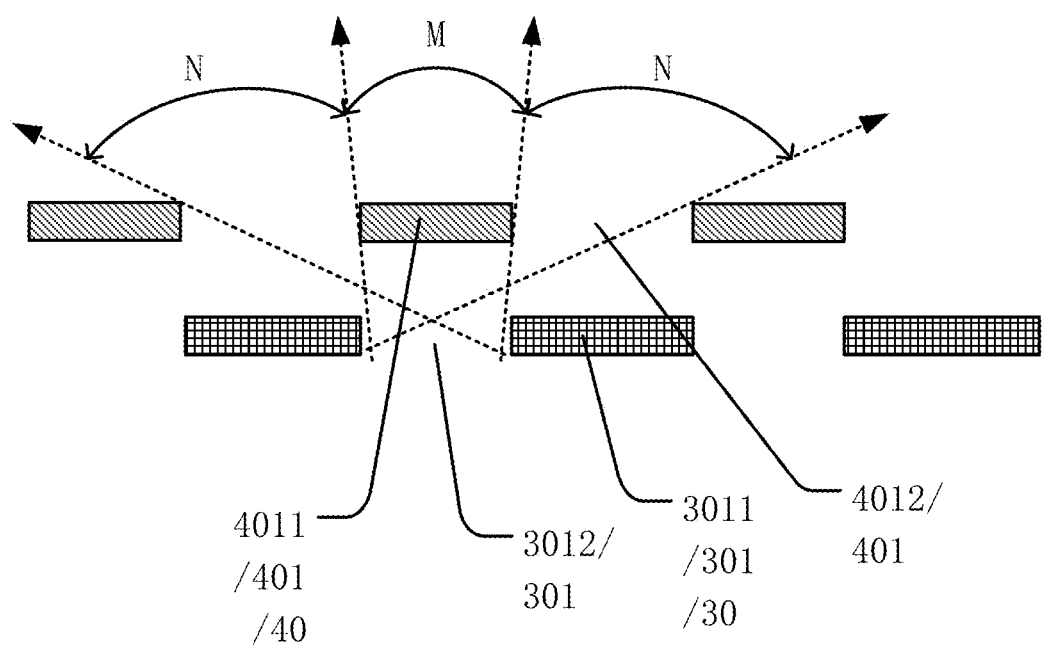
FIG. 5 illustrates a schematic diagram of an optical path transmission structure in a highlighted pixel region according to various embodiments of the present disclosure.

Optionally, referring to FIGS. 1-5, FIG. 5 illustrates a schematic diagram of an optical path transmission structure in the highlighted pixel region 02 when the display panel provided in one embodiment is used. As shown in FIG. 5, when the user views from the front viewing angle which is the range of the viewing angle of M in FIG. 5 (the front viewing angle is used to describe the viewing angle range in following embodiments), the light may not transmit the highlighted pixel region 02, the color pixel region 01 may be provided with the backlight light from the backlight module (not shown in FIGS. 1-5), in conjunction with the structure of the display panel 000 in the color pixel region 01, thereby implementing that the normal display pictures may be viewed from the front viewing angle. When the user is at the oblique viewing angle which is the range of the viewing angle of N in FIG. 5 (the oblique viewing angle is used to describe such viewing angle range in following embodiments), the oblique light leakage may occur in the highlighted pixel region 02, that is, the viewer may view white pictures. That is, what is viewed at the oblique viewing angle may be on-state pictures, not real color pictures which are displayed by the color pixel region 01 of the display panel 000, thereby implementing the anti-peep function.

It can be understood that the viewing angle M of the front viewing angle and the viewing angle N of the oblique viewing angle may not be limited in one embodiment. In an implementation, the viewing angle N of the oblique viewing angle may be configured by adjusting the distance between the first light-blocking layer 30 and the second light-blocking layer 40 along the direction Z perpendicular to the light-exiting surface of the display panel. The viewing angle M of the front viewing angle can be understood as the viewing angle range where no light leakage from the highlighted pixel region 02 can be viewed. The angle values of above-mentioned two viewing angles may be selected and configured according to the size of each structure in the actual product. In one embodiment, it may only need to satisfy that when the user views the display panel 000 from the oblique viewing angle, the display pictures may not be viewed, and only the on-state pictures may be viewed.

Optionally, as shown in FIG. 3, in the first light-blocking layer 30 on the side of the first substrate 10 facing the second substrate 20, to not affect the normal display of the color pixel region 01, the first light-blocking layer 30 may be disposed with the first sub-portion 3011 at the position corresponding to the second opening 4012 for blocking the light transmission performance of the highlighted pixel region 02 from the front viewing angle; and remaining regions including the first openings 3012 included in the first light-blocking layer 30 in the highlighted pixel regions 02 may all be hollow structures. That is, the first light-blocking layer 30 may only block light at the position corresponding to the second opening 4012, and remaining regions may all be hollow structures, thereby ensuring the normal display effect of the display panel 000 at the front viewing angle.

It should be noted that, in one embodiment, the number of the first openings 3012 and the first sub-portions 3011 included in the first light-blocking layer 30 in the highlighted pixel region 02 may not be limited. It may only need to satisfy that in the highlighted pixel region 02, one side of the first substrate 10 may include one first opening 3012, then one second sub-portion 4011 may need to be configured on the side of the second substrate 20 to overlap the first opening 3012; and one side of the second substrate 20 may include one second opening 4012, then one first sub-portion 3011 may need to be configured on the side of the first substrate 10 to overlap the second opening 4012, thereby satisfying the non-light-transmission effect of the highlighted pixel region 02 at the front viewing angle. During an implementation, the number of the first openings 3012 and the first sub-portions 3011 may be configured according to actual requirements, which may not be limited in one embodiment. In one embodiment, the shapes of the first openings 3012 and the first sub-portions 3011 included in the first light-blocking layer 30 and the shapes of the second openings 4012 and the second sub-portions 4011 included in the second light-blocking layer 40 in the highlighted pixel regions 02 may not be limited, which may take long strips as an example for illustration in FIG. 3. During an implementation, the shapes may be designed according to actual requirements, which may not be described in one embodiment.

It should be further noted that the pixel unit 00 shown in FIG. 3 of one embodiment may not represent its actual size but may only be used to clearly illustrate the structures of the color pixel region 01 and the highlighted pixel region 02 (a certain degree of proportional enlargement is performed). During an implementation, configuration may refer to the size of the pixel unit 00 in the existing technology, which may not be described in one embodiment.

Figure 6:
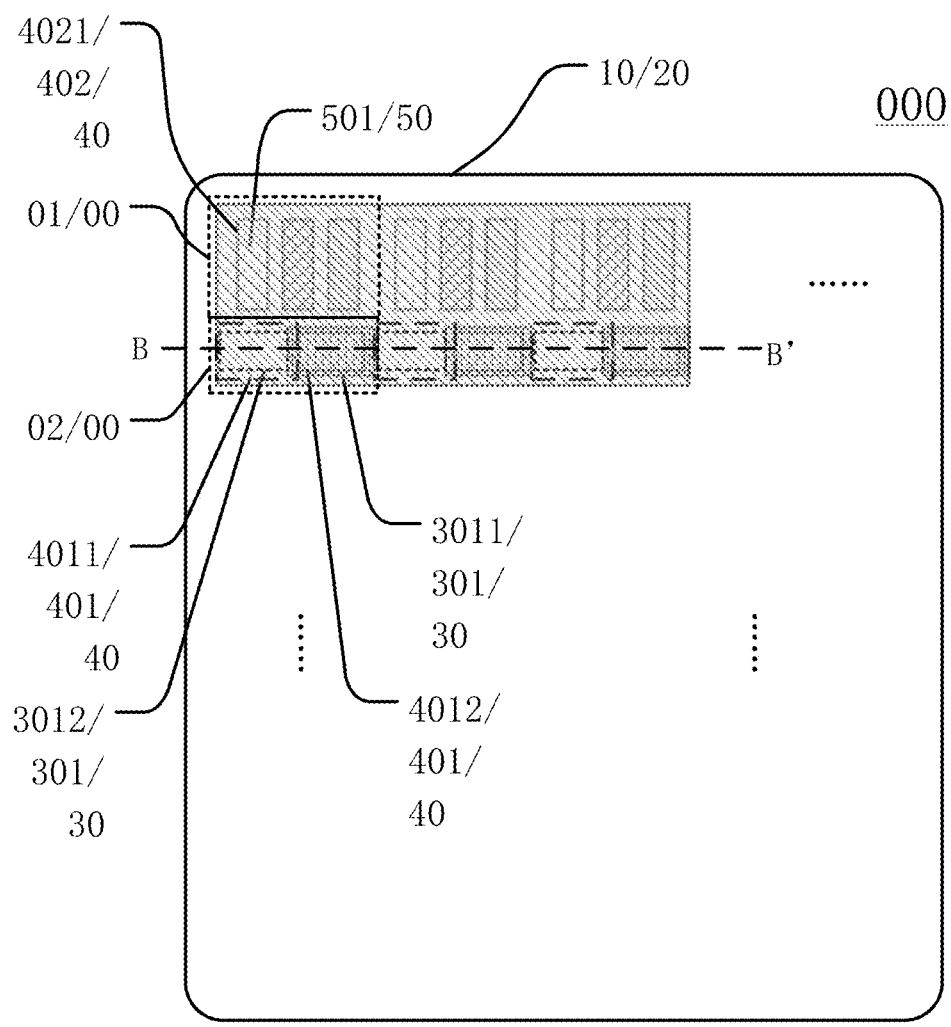
FIG. 6 illustrates another plan structural schematic of an exemplary display panel according to various embodiments of the present disclosure.
Figure 7:
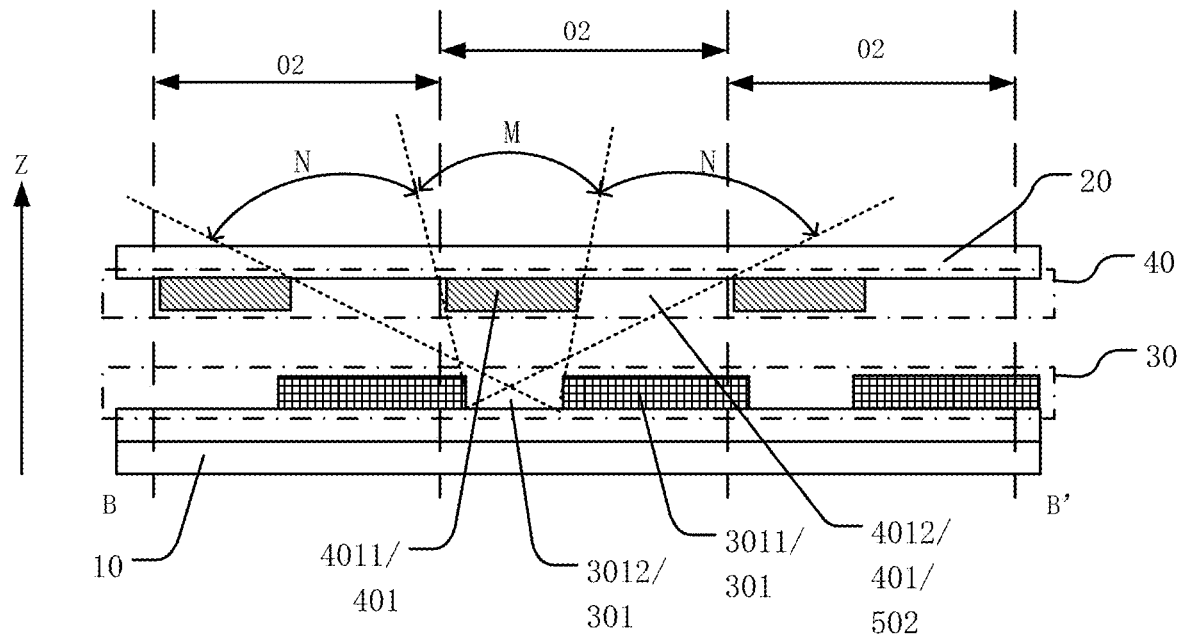
FIG. 7 illustrates a cross-sectional structural schematic along a B-B' direction in FIG. 6.
Figure 8:
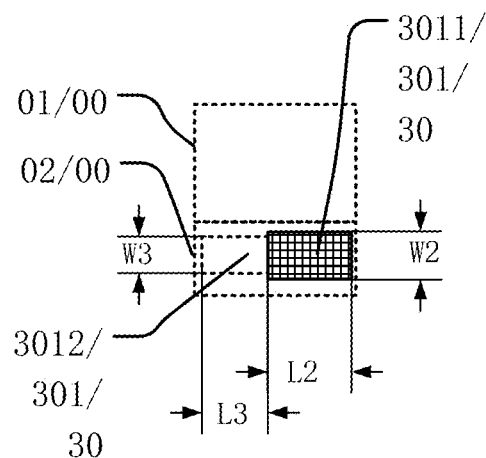
FIG. 8 illustrates a structural schematic of a first light-blocking layer and a color-resist layer within a range of a pixel unit in FIG. 6.
Figure 9:
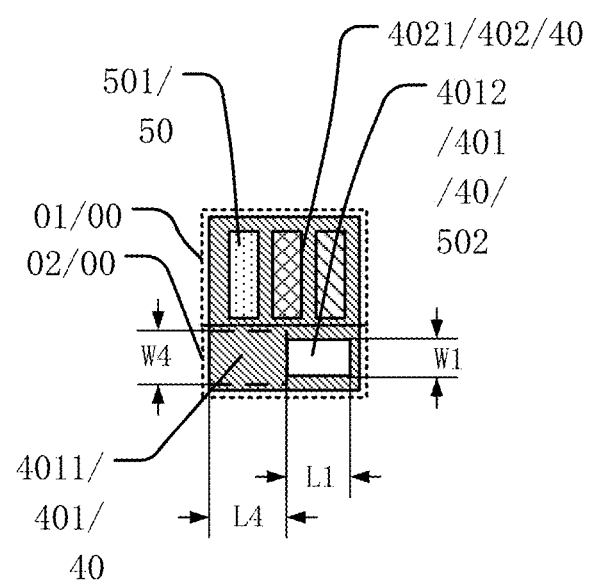
FIG. 9 illustrates a structural schematic of a second light-blocking layer within a range of a pixel unit in FIG. 6.

In some optional embodiments, referring to FIGS. 6-9, FIG. 6 illustrates another plan structural schematic of an exemplary display panel according to various embodiments of the present disclosure; FIG. 7 illustrates a cross-sectional structural schematic along a B-B' direction in FIG. 6; FIG. 8 illustrates a structural schematic of the first light-blocking layer and the color-resist layer within the range of the pixel unit in FIG. 6; and FIG. 9 illustrates a structural schematic of the second light-blocking layer within the range of the pixel unit in FIG. 6 (it can be understood that, to clearly illustrate the structure in one embodiment, transparency fill may be performed in FIG. 6). In one embodiment, in the highlighted pixel region 02, the orthographic projection of the second opening 4012 onto the first substrate 10 may be within the range of the orthographic projection of the first sub-portion 3011 onto the first substrate 10, and the orthographic projection of the first opening 3012 onto the first substrate 10 may be within the range of the orthographic projection of the second sub-portion 4011 to the first substrate 10.

In one embodiment, it may describe that within the range of the highlighted pixel region 02, when the orthographic projection of the second opening 4012 onto the first substrate 10 overlaps the orthographic projection of the first sub-portion 3011 onto the first substrate 10, the orthographic projection of the second opening 4012 onto the first substrate 10 may be configured to be within the range of the orthographic projection of the first sub-portion 3011 onto the first substrate 10. That is, along the direction Z perpendicular to the light-exiting surface of the display panel, the first sub-portion 3011 with light-blocking function may be disposed below the second opening 4012 formed on one side of the second substrate 20 and on the side of the first substrate 10, and the size of the second opening 4012 may also be designed to be smaller than the size of the first sub-portion 3011, as shown in FIGS. 8-9. If the shapes of the second opening 4012 and the first sub-portion 3011 are long strips, the length L1 of the second opening 4012 may be smaller than the length L2 of the first sub-portion 3011, and the width W1 of the second opening 4012 may be smaller than the width W2 of the first sub-portion 3011. In such way, along the direction Z perpendicular to the light-exiting surface of the display panel, the orthographic projection of the first sub-portion 3011 onto the first substrate 10 may cover the orthographic projection of the second opening 4012 onto the first substrate 10, so that the large-sized first sub-portion 3011 may better cover the second opening 4012. Therefore, it may avoid the light leakage, which may affect the display quality at the front viewing angle, at adjacent position of the first sub-portion 3011 and the second opening 4012 when the display panel 000 is viewed from the front viewing angle.

Moreover, in one embodiment, it may further describe that when the orthographic projection of the first opening 3012 onto the first substrate 10 overlaps the orthographic projection of the second sub-portion 4011 onto the first substrate 10, the orthographic projection of the first opening 3012 onto the first substrate 10 may also be configured to be within the range of the orthographic projection of the second sub-portion 4011 onto the first substrate 10. That is, along the direction Z perpendicular to the light-exiting surface of the display panel, the second sub-portion 4011 with light-blocking function may be disposed above the first opening 3012 formed on the side of the first substrate 10 and on the side of the second substrate 20, and the size of the first opening 3012 may also be designed to be smaller than the size of the second sub-portion 4011, as shown in FIGS. 8-9. If the shapes of the first opening 3012 and the second sub-portion 4011 are long strips, the length L3 of the first opening 3012 may be smaller than the length L4 of the second sub-portion 4011, and the width W3 of the first opening 3012 may be smaller than the width W4 of the second sub-portion 4011. In such way, along the direction Z perpendicular to the light-exiting surface of the display panel, the orthographic projection of the second sub-portion 4011 onto the first substrate 10 may cover the orthographic projection of the first opening 3012 onto the first substrate 10, so that the large-sized second sub-portion 4011 may better cover the first opening 3012. Therefore, it may avoid the light leakage, which may affect the display quality at the front viewing angle, at adjacent position of the second sub-portion 4011 and the first opening 3012 when the display panel 000 is viewed from the front viewing angle.

Therefore, in one embodiment, in the highlighted pixel region 02, the orthographic projection of the second opening 4012 onto the first substrate 10 may be configured to be within the range of the orthographic projection of the first sub-portion 3011 onto the first substrate 10, and the orthographic projection of the first opening 3012 onto the first substrate 10 may be configured to be within the range of the orthographic projection of the second sub-portion 4011 onto the first substrate 10. In such way, under the case of not affecting the anti-peep effect at the oblique viewing angle of the display panel, the light leakage at the front viewing angle may be further avoided, thereby being beneficial for improving the display quality at the front viewing angle.

Figure 10:
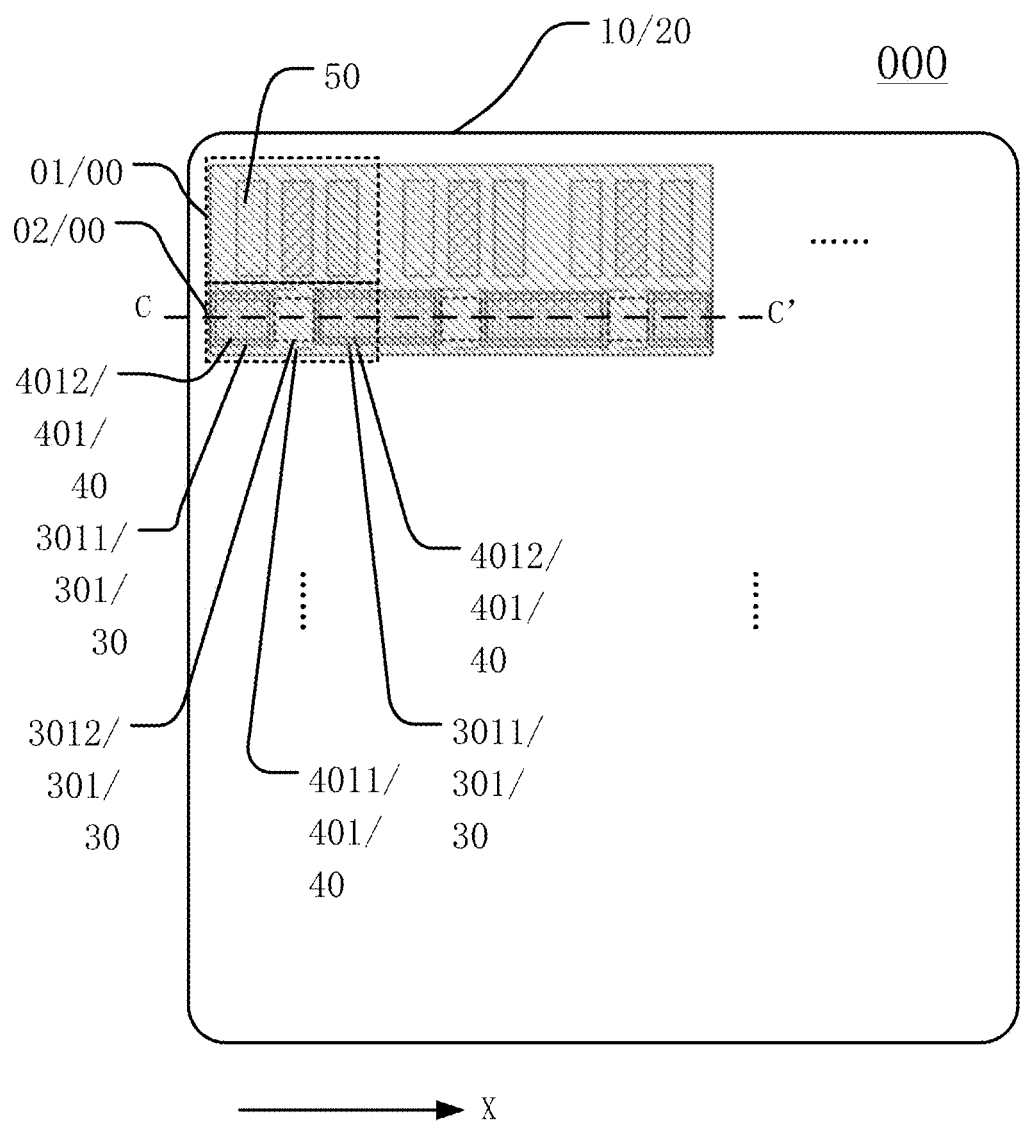
FIG. 10 illustrates another plan structural schematic of an exemplary display panel according to various embodiments of the present disclosure.
Figure 11:
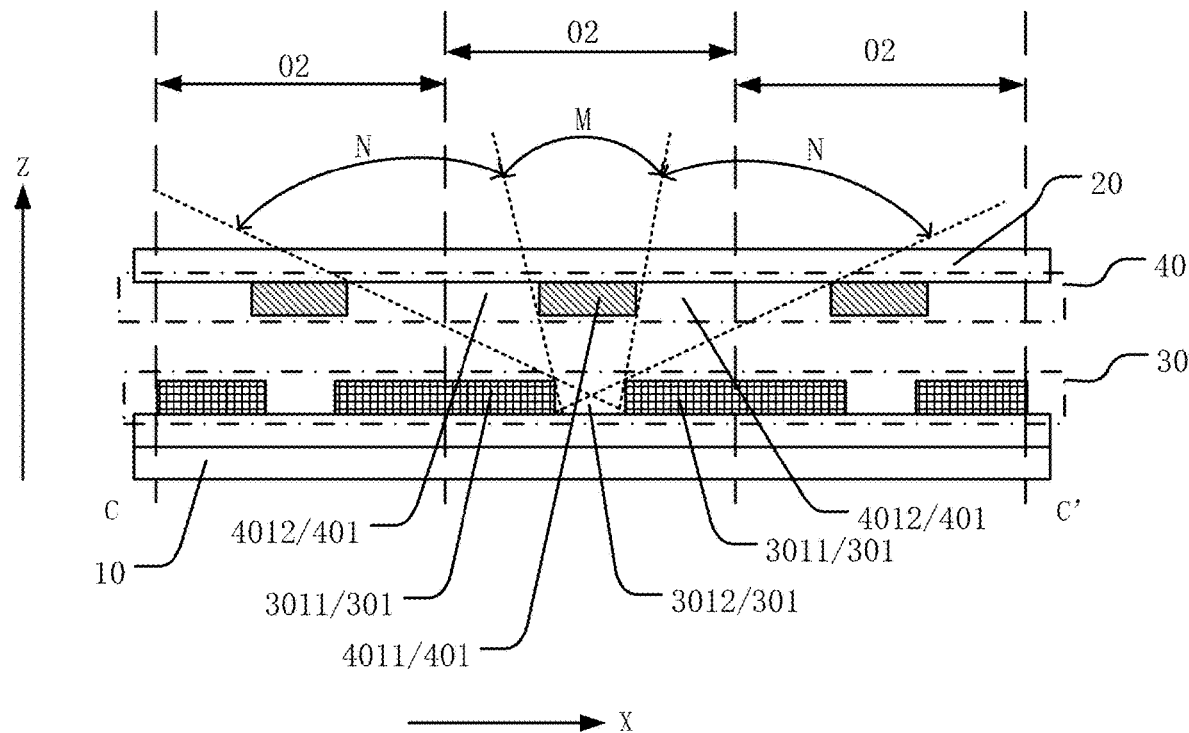
FIG. 11 illustrates a cross-sectional structural schematic along a C-C' direction in FIG. 10.
Figure 12:
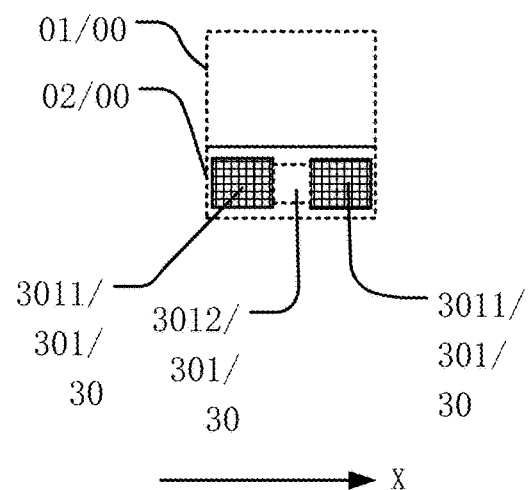
FIG. 12 illustrates a structural schematic of a first light-blocking layer and a color-resist layer within a range of a pixel unit in FIG. 10.
Figure 13:
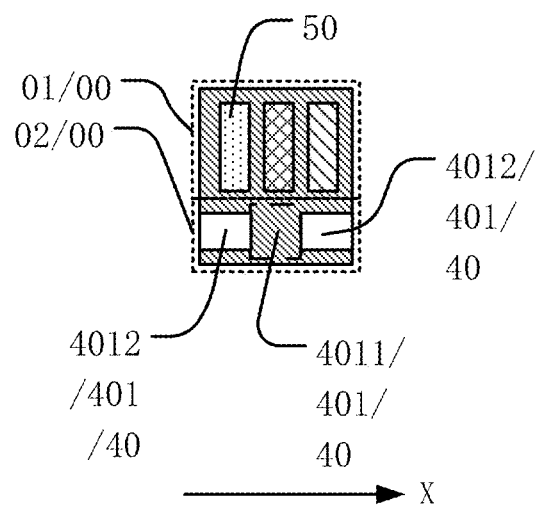
FIG. 13 illustrates a structural schematic of a second light-blocking layer within a range of a pixel unit in FIG. 10.

In some optional embodiments, referring to FIGS. 10-13, FIG. 10 illustrates another plan structural schematic of an exemplary display panel according to various embodiments of the present disclosure; FIG. 11 illustrates a cross-sectional structural schematic along a C-C' direction in FIG. 10; FIG. 12 illustrates a structural schematic of the first light-blocking layer and the color-resist layer within the range of the pixel unit in FIG. 10; and FIG. 13 illustrates a structural schematic of the second light-blocking layer within the range of the pixel unit in FIG. 10 (it can be understood that, to clearly illustrate the structure in one embodiment, transparency fill may be performed in FIG. 10). In one embodiment, the first light-blocking portion 301 may include one first opening 3012 and two first sub-portions 3011. Along the direction X in parallel with the plane of the first substrate 10, one first opening 3012 may be located between two adjacent first sub-portions 3011.

The second light-blocking portion 401 may include one second sub-portion 4011 and two second openings 4012. Along the direction X in parallel with the plane of the first substrate 10, one second sub-portion 4011 may be located between two adjacent second openings 4012.

In one embodiment, it may describe that, in the highlighted pixel region 02 of one pixel unit 00, the second light-blocking portion 401 disposed on the side of the second substrate 20 facing the first substrate 10 may include one second sub-portion 4011 and two second openings 4012. The arrangement of two second openings 4012 may be beneficial for increasing the light leakage direction at the oblique viewing angle. As shown in FIG. 11, in a next pixel unit 00 at the oblique viewing angle, there may be light leakage in at least two directions (because along the direction X in parallel with the plane of the first substrate 10, two second openings 4012 may be located at opposite sides of one second sub-portion 4011), thereby enhancing the on-state display effect of the oblique viewing angle. Optionally, the second light-blocking portion 401 on one side of the second substrate 10 includes one second sub-portion 4011 and two second openings 4012, such that the first light-blocking portion 301 disposed on the side of the first substrate 10 facing the second substrate 20 may include one first opening 3012 and two first sub-portions 3011, correspondingly. Along the direction Z perpendicular to the light-exiting surface of the display panel, the first sub-portion 3011 with light-blocking function may be disposed below the second opening 4012 formed on one side of the second substrate 20 and on one side of the first substrate 10, such that the orthographic projections of two first sub-portions 3011 onto the first substrate 10 may respectively cover the orthographic projections of two second openings 4012 onto the first substrate 10. Along the direction Z perpendicular to the light-exiting surface of the display panel, the second sub-portion 4011 with light-blocking function may be above the first opening 3012 formed on one side of the first substrate 10 and on one side of the second substrate 20, such that the orthographic projections of two second sub-portions 4011 onto the first substrate 10 may respectively cover the orthographic projections of two first openings 3012 onto the first substrate 10, and the large-sized second sub-portion 4011 may better cover the first opening 3012. Therefore, it may avoid the light leakage at adjacent position of the first sub-portion 3011 and the second opening 4012 and at adjacent position of the second sub-portion 4011 and the first opening 3012 when the display panel 000 is viewed from the front viewing angle, thereby further improving the display quality at the front viewing angle.

Figure 14:
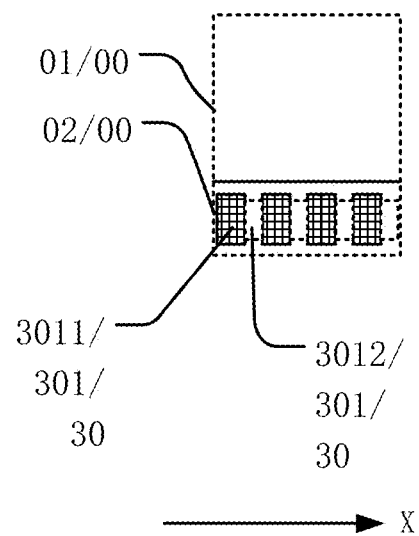
FIG. 14 illustrates another structural schematic of a first light-blocking layer and a color-resist layer within a range of a pixel unit according to various embodiments of the present disclosure.
Figure 15:
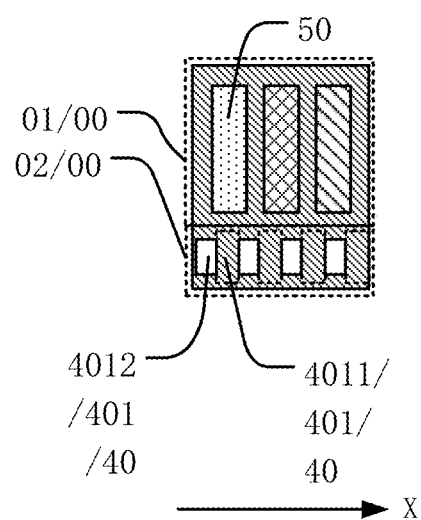
FIG. 15 illustrates another structural schematic of a second light-blocking layer within a range of a pixel unit according to various embodiments of the present disclosure.
Figure 16:
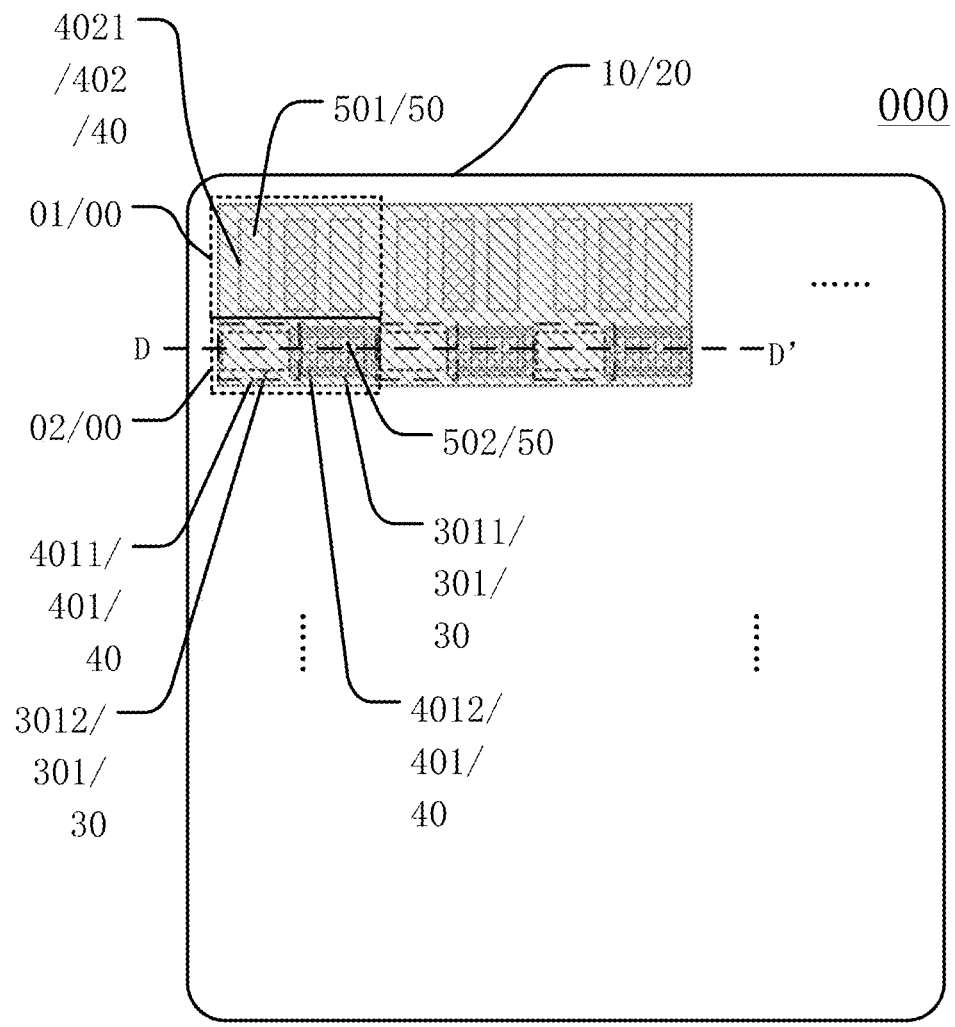
FIG. 16 illustrates another plan structural schematic of an exemplary display panel according to various embodiments of the present disclosure.

It can be understood that, in one embodiment, it may exemplarily illustrate that when the second light-blocking portion 401 includes one second sub-portion 4011 and two second openings 4012 and when the first light blocking portion 301 includes one first opening 3012 and two first sub-portions 3011, the openings and the sub-portions may be arranged adjacent to each other in sequence along the direction X in parallel with the plane of the first substrate 10; and the number of openings included in the light-blocking portions may include, but not be limited to, the above-mentioned embodiments. Optionally, referring to FIGS. 14-15, FIG. 14 illustrates a structural schematic of the first light-blocking layer and the color-resist layer within the range of a pixel unit according to various embodiments of the present disclosure; and FIG. 15 illustrates a structural schematic of the second light-blocking layer within the range of a pixel unit according to various embodiments of the present disclosure. The first light-blocking portion 301 may further include a plurality of first sub-portions 3011 and a plurality of first openings 3012, which may only need to satisfy that, along the direction X in parallel with the plane of the first substrate 10, one first opening 3012 may be located between two adjacent first sub-portions 3011. Correspondingly, the side of the second substrate 20 facing the first substrate 10 may have a corresponding number of second openings 4012 corresponding to the first sub-portions 3011 and have a corresponding number of second sub-portions 4011 corresponding to the first openings 3012. The number of openings included in the light-blocking portions may not be limited in one embodiment.

Figure 17:
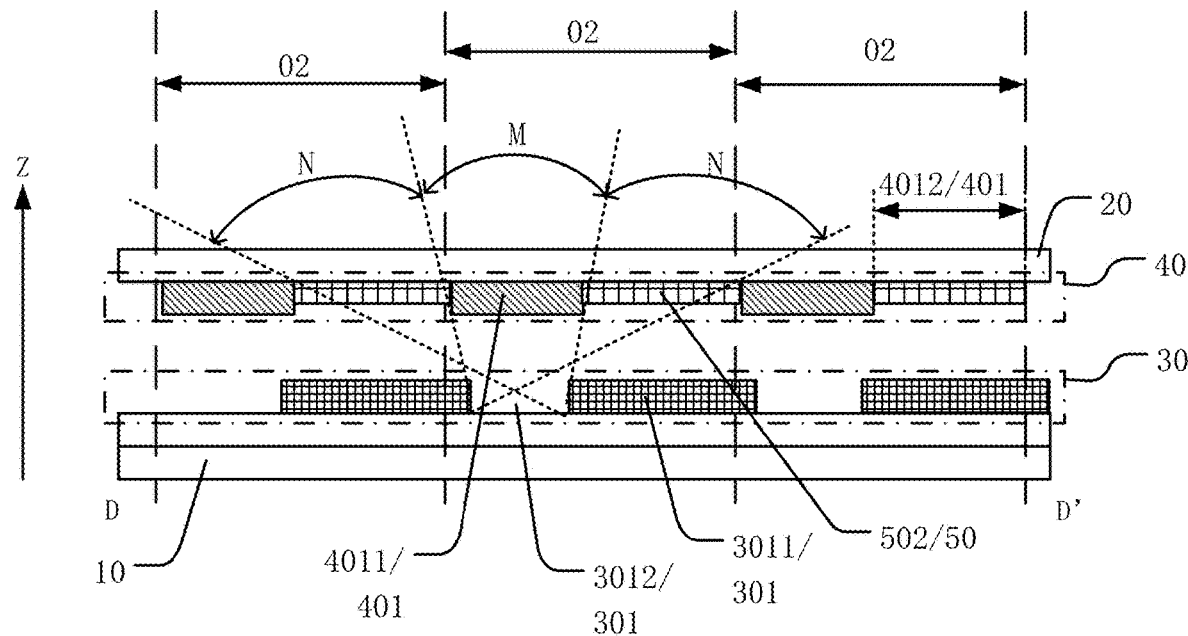
FIG. 17 illustrates a cross-sectional structural schematic along a D-D' direction in FIG. 16.
Figure 18:
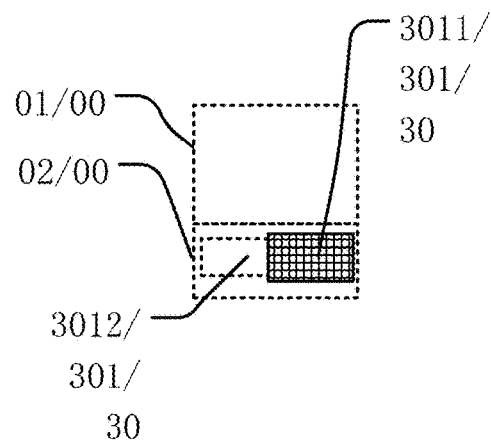
FIG. 18 illustrates a structural schematic of a first light-blocking layer and a color-resist layer within a range of a pixel unit in FIG. 16.
Figure 19:
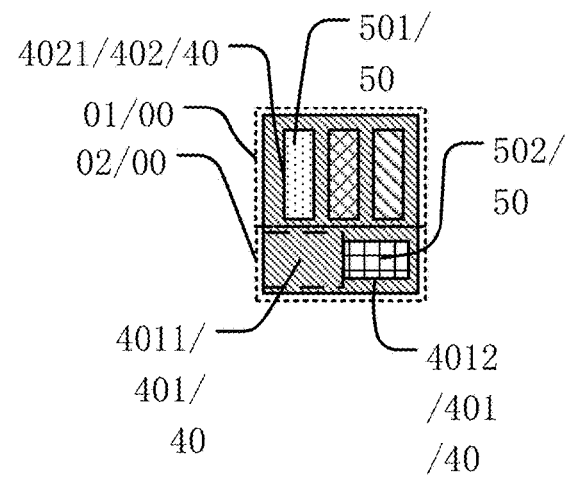
FIG. 19 illustrates a structural schematic of a second light-blocking layer within a range of a pixel unit in FIG. 16.
Figure 20:
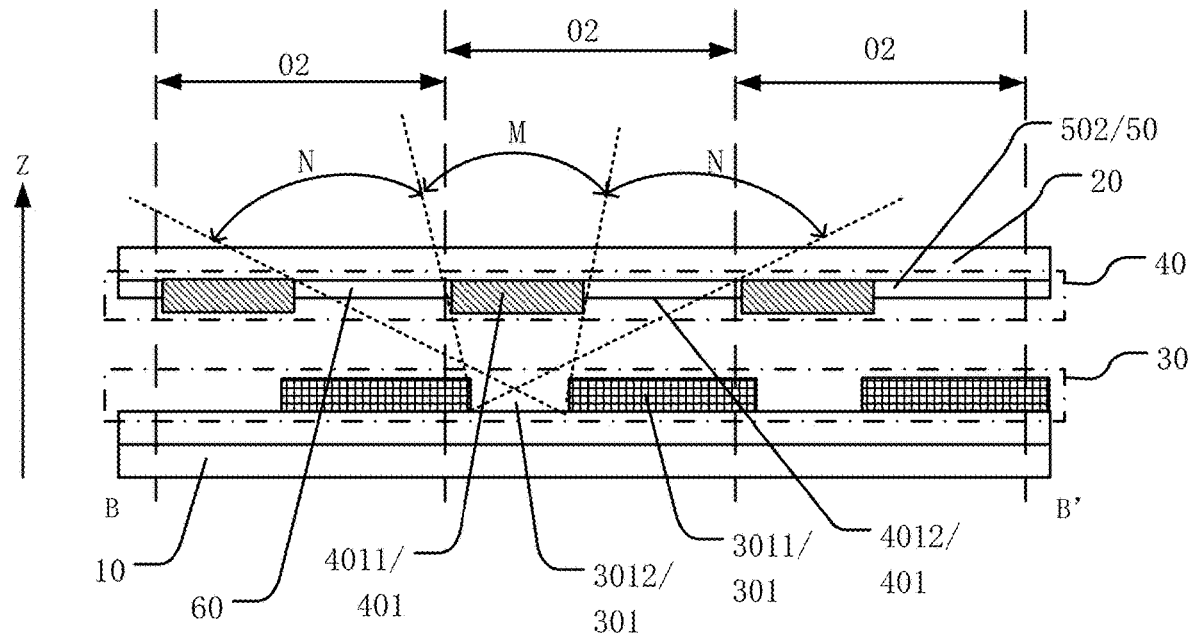
FIG. 20 illustrates another cross-sectional structural schematic along a B-B' direction in FIG. 6.

In some optional embodiments, referring to FIGS. 6-9 and FIGS. 16-20, FIG. 16 illustrates another plan structural schematic of an exemplary display panel according to various embodiments of the present disclosure; FIG. 17 illustrates a cross-sectional structural schematic along a D-D' direction in FIG. 16; FIG. 18 illustrates a structural schematic of the first light-blocking layer and the color-resist layer within the range of the pixel unit in FIG. 16; FIG. 19 illustrates a structural schematic of the second light-blocking layer within the range of the pixel unit in FIG. 16; and FIG. 20 illustrates another cross-sectional structural schematic along a B-B' direction in FIG. 6 (it can be understood that, to clearly illustrate the structure in one embodiment, transparency fill may be performed in FIG. 16). In one embodiment, the color-resist layer 50 may include a color color-resist 501 and a light-transmitting portion 502. The color color-resist 501 may be in the color pixel region 01, the light-transmitting portion 502 may be in the highlighted pixel region 02. The transmittance of the light-transmitting portion 502 may be greater than the transmittance of the color-resist 501.

In one embodiment, it may describe that the color-resist layer 50 on the side of the second substrate 20 facing the first substrate 10 may include the color color-resist 501 in the color pixel region 01. Optionally, in the color pixel region 01 of one pixel unit 00, the second light-blocking layer 40 may further include the third light-blocking portion 402, the third light-blocking portion 402 may include a plurality of third openings 4021, and the color color-resist 501 may be disposed in the third openings 4021. The second light-blocking layer 40 may be understood as a black matrix layer on one side of the second substrate 20, and the third opening 4021 may be understood as the opening of the black matrix layer disposed with the color color-resist 501, which may be configured to avoid light crosstalk between adjacent color color-resists 501 while implementing color display. Optionally, the color pixel region 01 of one pixel unit 00 may include three different color color-resists 501 (respectively indicated by different filling patterns in above-mentioned figures), such as a red color-resist, a green color-resist, and a blue color-resist, thereby implementing the normal display of the color picture in the color pixel region 01. The color-resist layer 50 on the side of the second substrate 20 facing the first substrate 10 may further include the light-transmitting portion 502 in the highlighted pixel region 02. Optionally, the light-transmitting portion 502 may be fitted in the second opening 4012 of the second light-blocking portion 401, and the number of light-transmitting portions 502 included in the highlighted pixel region 02 of one pixel unit 00 may be same as the number of second openings 4012 included in one second light-blocking portion 401. In one embodiment, the transmittance of the light-transmitting portion 502 may be configured to be greater than the transmittance of the color color-resist 501, which may be understood as that the transmittance of the material of the light-transmitting portion 502 is greater than the transmittance of the material of the color color-resist 501. Therefore, the light leakage at the oblique viewing angle may be efficiently transmitted through the light-transmitting portion 502, and the user at the oblique viewing angle may view the highlighted white light, thereby implementing the anti-peep effect at the oblique viewing angle.

Optionally, the light-transmitting portion 502 in one embodiment may include any one of a highlighted color-resist material, a transparent material, or a hollow portion.

For example, as shown in FIGS. 6-9, the light-transmitting portion 502 may be a hollow portion; that is, the light-transmitting portion 502 may not have any material, which may be understood as the second opening 4012. The second opening 4012 may be reused as the light-transmitting portion 502 with high transmittance, such that the light leakage effect at the oblique viewing angle may be desirable.

Or, as shown in FIGS. 16-19, the light-transmitting portion 502 may include a highlighted color-resist material, such as a white color-resist or a yellow color-resist (filling with patterns in FIGS. 16-19). When using an organic material to fabricate the white color-resist, due to the limitations of the material itself, obtained white color-resist may not be able to ensure pure white or may be slightly yellow, such that the yellow color-resist may also be understood as the highlighted color-resist. The light-transmitting portion 502 using the highlighted color-resist material may be fitted in the second opening 4012. The light-transmitting portion 502 made of the highlighted color-resist material may have high transmittance, such that the light leakage effect at the oblique viewing angle may be desirable.

Or, as shown in FIGS. 6 and 20, when the second substrate 20 is used as the color filter substrate, a transparent protective layer 60 (not filled in FIGS. 6 and 20) may be further included on the side of the color-resist layer 50 away from the second substrate 20. The light-transmitting portion 502 may be made of a transparent material. The light-transmitting portion 502 may be made of a same material in a same layer as the transparent protective layer 60. It is equivalent to that after the color-resist layer 50 is fabricated, the corresponding region of the light-transmitting portion 502 is hollow, and in the process of fabricating the transparent protective layer 60, the transparent material corresponding to the transparent protective layer 60 may be filled into the region to form the light-transmitting portion 502. Optionally, the material of the transparent protective layer 60 and the light-transmitting portion 502 may be transparent resin. Therefore, the light-transmitting portion 502 may have high transmittance, the light leakage effect at the oblique viewing angle may be desirable, and it may also be beneficial for simplifying the manufacturing process of the light-transmitting portion 502 and improving the manufacturing efficiency.

Optionally, referring to FIGS. 6-9, FIGS. 16-20, the third light-blocking portion 402 and the second light-blocking portion 401 may be connected to each other. The third light-blocking portion 402 and the second light-blocking portion 401 are both located in the second light-blocking layer 40, such that, during the manufacturing process, the third light-blocking portion 402 and the second light-blocking portion 401 of the second light-blocking layer 40 may be fabricated in a same layer and with a same process. It is equivalent to that the fabricated third light-blocking portion 402 and the second light-blocking portion 401 may be connected to each other at adjacent position of the highlighted pixel region 02 and the color pixel region 01 to form a single piece. Therefore, the film layer structure on the side of the second substrate 20 may be simplified, and the manufacturing efficiency may be improved.

Figure 21:
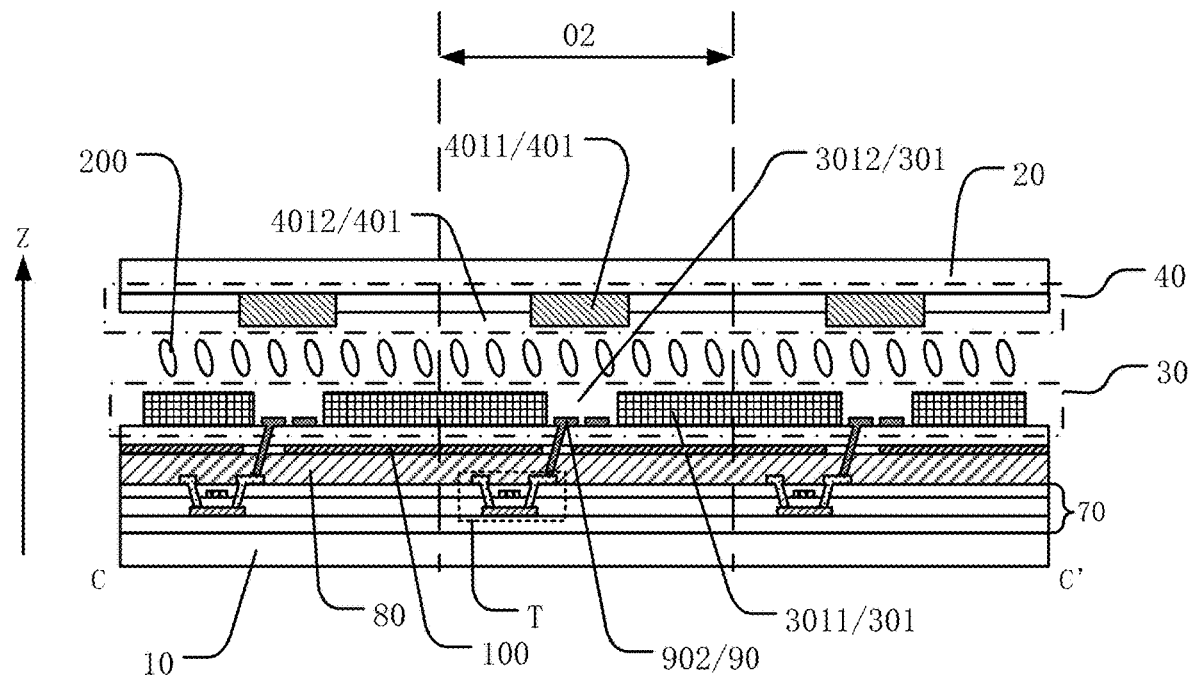
FIG. 21 illustrates another cross-sectional structural schematic along a C-C' direction in FIG. 10.
Figure 22:
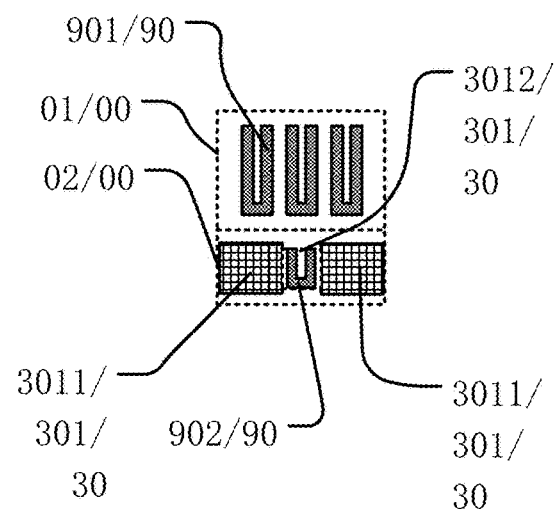
FIG. 22 illustrates a structural schematic of a side view of the first substrate facing the second substrate within a range of the pixel unit in FIG. 10.
Figure 23:
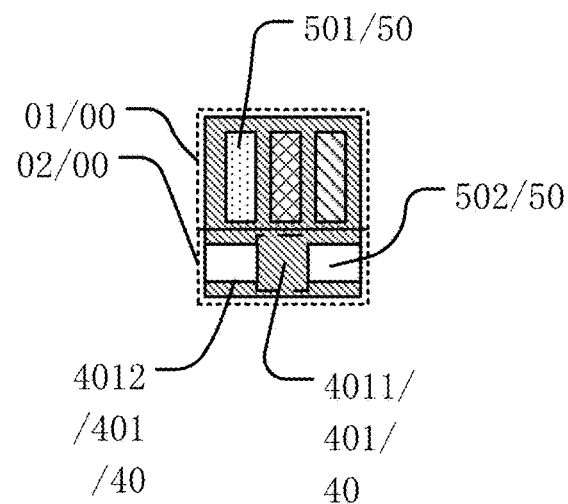
FIG. 23 illustrates a structural schematic of a side view of the second substrate facing the first substrate within a range of the pixel unit in FIG. 10.

In some optional embodiments, referring to FIG. 10 and FIGS. 21-23, FIG. 21 illustrates another cross-sectional structural schematic along a C-C' direction in FIG. 10; FIG. 22 illustrates a structural schematic of a side view of the first substrate facing the second substrate within the range of the pixel unit in FIG. 10; and FIG. 23 illustrates a structural schematic of a side view of the second substrate facing the first substrate within the range of the pixel unit in FIG. 10. In one embodiment, the side of the first substrate 10 facing the second substrate 20 may further include a thin film transistor array layer 70, a planarization layer 80, and a pixel electrode layer 90. The thin film transistor array layer 70 may be on one side of the first substrate 10, the planarization layer 80 may be on the side of the thin film transistor array layer 70 away from the first substrate 10, and the pixel electrode layer 90 may be on the side of the thin film transistor array layer 70 away from the first substrate 10.

The pixel electrode layer 90 may include the first pixel electrode 901 and the second pixel electrode 902, the first pixel electrode 901 may be in the color pixel region 01, and the second pixel electrode 902 may be in the highlighted pixel region 02. Optionally, the thin film transistor array layer 70 may include a plurality of thin film transistors T; the thin film transistor T (not shown in FIGS. 21-23) in the color pixel region 01 may be electrically connected to the first pixel electrode 901 to control the color pixel region 01 to emit light; and the thin film transistor T in the highlighted pixel region 02 may be electrically connected to the second pixel electrode 902 to control the highlighted pixel region 02 to emit light.

In one embodiment, it may further describe that when the first substrate 10 is used as an array substrate, the side of the first substrate 10 facing the second substrate 20 may further include the thin film transistor array layer 70, the planarization layer 80, and the pixel electrode layer 90. Optionally, the thin film transistor array layer 70 may be on one side of the first substrate 10, the planarization layer 80 may be on the side of the thin film transistor array layer 70 away from the first substrate 10, and the pixel electrode layer 90 may be on the side of the thin film transistor array layer 70 away from the first substrate 10. The thin film transistor array layer 70 may be used for disposing a plurality of thin film transistors T, and thin film transistors T may be disposed in the range of the color pixel region 01 and the highlighted pixel region 02 of the pixel unit 00. The planarization layer 80 may be used to cover the thin film transistor array layer 70, so that the surface of the planarization layer 80 on the side away from the thin film transistor array layer 70 may be planarized, which may be beneficial to the fabrication of subsequent electrode film layers; and the coupling between the thin film transistor T and the electrode layer may also be reduced by the thickness of the planarization layer 80. The pixel electrode layer 90 may include the first pixel electrode 901 and the second pixel electrode 902, the first pixel electrode 901 may be in the color pixel region 01, and the second pixel electrode 902 may be in the highlighted pixel region 02. The thin film transistor T in the color pixel region 01 may be electrically connected to the first pixel electrode 901 to control the color pixel region 01 to emit light, and the thin film transistor T in the highlighted pixel region 02 may be electrically connected to the second pixel electrode 902 to control the highlighted pixel region 02 to emit light. In one embodiment, the electrical connection structure and connection manner between the thin film transistor T and the pixel electrode may not be described in detail. Details may refer to the connection manner and working principle of the drain electrode of the thin film transistor and the pixel electrode in the existing technology. In one embodiment, the first pixel electrode 901 of the color pixel region 01 and the second pixel electrode 902 of the highlighted pixel region 02 may be controlled by different thin film transistors T, which may be beneficial for independent control of two regions. For example, when users need to protect their privacy in public places, the thin film transistor T of the highlighted pixel region 02 may be turned on, so that the highlighted pixel region 02 may emit light, and then light may be leaked at the oblique viewing angle, thereby implementing the anti-peep function of the oblique viewing angle. In other scenarios, the thin film transistor T of the highlighted pixel region 02 may be turned off, and only the thin film transistor T of the color pixel region 01 may be turned on, so that the color pixel region 01 may emit light, which may be beneficial for reducing power consumption and improving lifetime.

It can be understood that, along the direction perpendicular to the light-exiting surface of the display panel 000, the thin film transistor T in one embodiment may be disposed below the light-blocking layer. For example, the thin film transistor T in the color pixel region 01 may be located below the third light-blocking portion 402 of the second light-blocking layer 40 (not shown in FIGS. 21-23); the thin film transistor T in the highlighted pixel region 02 may be located below the first sub-portion 3011 of the first light-blocking portion 301 of the first light-blocking layer 30 (as shown in FIG. 21), and may also be located below the second sub-portion 4011 of the second light-blocking portion 401 of the second light-blocking layer 40 (not shown in FIGS. 21-23), which may be beneficial for improving the performance of the thin film transistor and avoiding being affected by light.

It should be noted that, in one embodiment, it may exemplarily illustrate the electrical connection manner between the thin film transistor T and the pixel electrode of the pixel electrode layer 90; and in an implementation, it may include, but not be limited to, such connection manner. The electrical connection between the thin film transistor T and the pixel electrode of the pixel electrode layer 90 may be implemented by direct punching holes in the insulating layers between the thin film transistor T and the pixel electrode layer 90, or the thin film transistor T may also be electrically connected to the pixel electrode of the pixel electrode layer 90 by punching holes layer by layer (for example, when multiple insulating layers are included between the pixel electrode layer 90 and the film layer of the thin film transistor T), which may not be limited in one embodiment as long as the electrical connection between thin film transistor T and the pixel electrode of the pixel electrode layer 90 is achieved to transmit electrical signals.

Optionally, the display panel 000 in one embodiment may further include a common electrode layer 100. In FIG. 21, it may only exemplarily illustrate that the common electrode layer 100 is located on the side of the pixel electrode layer 90 adjacent to the planarization layer 80. In an implementation, the common electrode layer 100 may also be located on the side of the pixel electrode layer 90 away from the planarization layer 80, or the common electrode layer 100 may also be located on the side of the second substrate 20 facing the first substrate 10, or the common electrode layer 100 may also be disposed in a same layer as the pixel electrode layer 90, which may be understood according to the positional relationship between the pixel electrode layer and the common electrode layer in the existing technology during an implementation. In FIG. 21 of one embodiment, the thin film transistor may be illustrated by taking a top gate structure as an example. The thin film transistor may include, but not be limited to, such structure, and may also a bottom gate structure, which may be selected and configured according to actual needs in an implementation.

Optionally, the display panel 000 in one embodiment may be a liquid crystal display panel, and the side of the first substrate 10 facing the second substrate 20 may further include a plurality of signal lines such as gate lines and data lines (not shown in FIGS. 21-23, and it can be understood with reference to the display principle of the display panel in the existing technology, which may not be described in details in one embodiment). The thin film transistor T may be used as a switching device of the pixel unit 00 in the display panel 000. The gate electrode of the thin film transistor T may be connected to the gate line of the display panel 000 and may be connected to the gate scan circuit via the gate line; and the source electrode of the thin film transistor T may be connected to the data line and may be connected to an integrated circuit chip (IC) via the data line. The drain electrode of the thin film transistor T of the color pixel region 01 may be connected to the first pixel electrode 901 of the pixel electrode layer 90, and the drain electrode of the thin film transistor T in the highlighted pixel region 02 may be connected to the second pixel electrode 902 of the pixel electrode layer 90. A voltage may be applied to the first pixel electrode 901 and the second pixel electrode 902 of the pixel electrode layer 90 through the data line, such that an electric field may be formed between the first pixel electrode 901 and the common electrode layer 100, and an electric field may be formed between the second pixel electrode 902 and the common electrode layer 100. Furthermore, the liquid crystal molecules of the liquid crystal layer 200 (as shown in FIG. 21) may be deflected in the electric fields to control whether the light is emitted or not, thereby implementing the display effect of the display panel 000. Optionally, the first pixel electrode 901 of the color pixel region 01 and the second pixel electrode 902 of the highlighted pixel region 02 may be connected to different data lines or different gate lines to achieve separate control, or the first pixel electrode 901 of the color pixel region 01 and the second pixel electrode 902 of the highlighted pixel region 02 may be connected to a common data line or a common gate line to jointly control whether the light is emitted or not, which may not be limited in one embodiment and may be selected according to actual needs during an implementation.

It should be noted that FIGS. 21-23 in one embodiment may only exemplarily illustrate the shapes of the first pixel electrode 901 and the second pixel electrode 902. During an implementation, the shapes of the pixel electrodes may include, but not be limited to, above-mentioned shapes, and may also include other shapes, which may not be limited in one embodiment.

Optionally, the second opening 4012 in one embodiment may be disposed with the light-transmitting portion 502. That is, when the light-transmitting portion 502 is fitted into the second opening 4012 of the second light-blocking portion 401, the material of the light-transmitting portion 502 may be selected from a same material as the planarization layer 80, such as polyimide resin, polyvinyl alcohol resin, epoxy resin, acrylic resin, and other transparent insulating materials known to those skilled in the art, which may not be limited herein. By setting the material of the light-transmitting portion 502 to be same as the material of the planarization layer 80, that is, by setting the refractive index of the light-transmitting portion 502 to be same as the planarization layer 80, the light may transmit the light-transmitting portion 502 and the planarization layer 80 without reflection loss. Therefore, the light leakage effect at the oblique viewing angle may be improved, and the white light brightness at the oblique viewing angle may be improved, which may be beneficial for improving the anti-peep effect.

In some optional embodiments, referring to FIG. 10 and FIGS. 21-23, in one embodiment, the first light-blocking layer 30 may be located on the side of the pixel electrode layer 90 away from the first substrate 10.

The orthographic projection of the second pixel electrode 902 onto the first substrate 10 may overlap the orthographic projection of the first opening 3012 onto the first substrate 10.

In one embodiment, it may describe that the pixel electrode layer 90 may be fabricated before the first light-blocking layer 30 is fabricated. That is, after the pixel electrode layer 90 is fabricated on the first substrate 10, the first light-blocking layer 30 may be fabricated to form the first opening 3012 and the first sub-portion 3011. The orthographic projection of the second pixel electrode 902 of the pixel electrode layer 90 onto the first substrate 10 in the highlighted pixel region 02 of one embodiment may overlap the orthographic projection of the first opening 3012 onto the first substrate 10. That is, the first opening 3012 of the first light-blocking layer 30 may be formed at the position of the second pixel electrode 902, and the liquid crystal molecules of the liquid crystal layer 200 in the highlighted pixel region 02 may be driven to be deflected by the electric field generated between the second pixel electrode 902 and the common electrode layer 100, thereby implementing the on-state display effect of the highlighted pixel region 02. Along the direction Z perpendicular to the light-exiting surface of the display panel, the highlighted pixel region 02 at the front viewing angle may be blocked by the first sub-portion 3011 and the second sub-portion 4011, such that the highlighted pixel region 02 may not be seen to emit light at the front viewing angle, and the light may be leaked out at the oblique viewing angle. The viewer may only view the on-state light-emitting effect at the oblique viewing angle, thereby implementing the on-state anti-peep function at the oblique viewing angle.

Optionally, the orthographic projection of the second pixel electrode 902 onto the first substrate 10 may be within the range of the orthographic projection of the first opening 3012 onto the first substrate 10. That is, the size of the orthographic projection of the second pixel electrode 902 onto the first substrate 10 may be smaller than the size of the orthographic projection of the first opening 3012 onto the first substrate 10; and furthermore, the second pixel electrode 902 may be blocked by the second sub-portion 4011 above the second pixel electrode 902, which may avoid that the disposed second pixel electrode 902 exceeds the range of the second sub-portion 4011 to cause light leakage at the front viewing angle to affect the normal display effect of the color pixel region 01.

Optionally, to ensure the light leakage effect at the oblique viewing angle, a certain distance may be configured between the first light-blocking layer 30 and the second light-blocking layer 40 to avoid that the distance between the first light-blocking layer 30 and the second light-blocking layer 40 is too small to affect the on-state effect of the oblique viewing angle. For example, when the distance between the first light-blocking layer 30 and the second light-blocking layer 40 is excessively small, the white light of the highlighted pixel region 02 viewed at the oblique viewing angles may be reduced, which may easily affect the on-state anti-peep effect at the oblique viewing angle.

Figure 24:
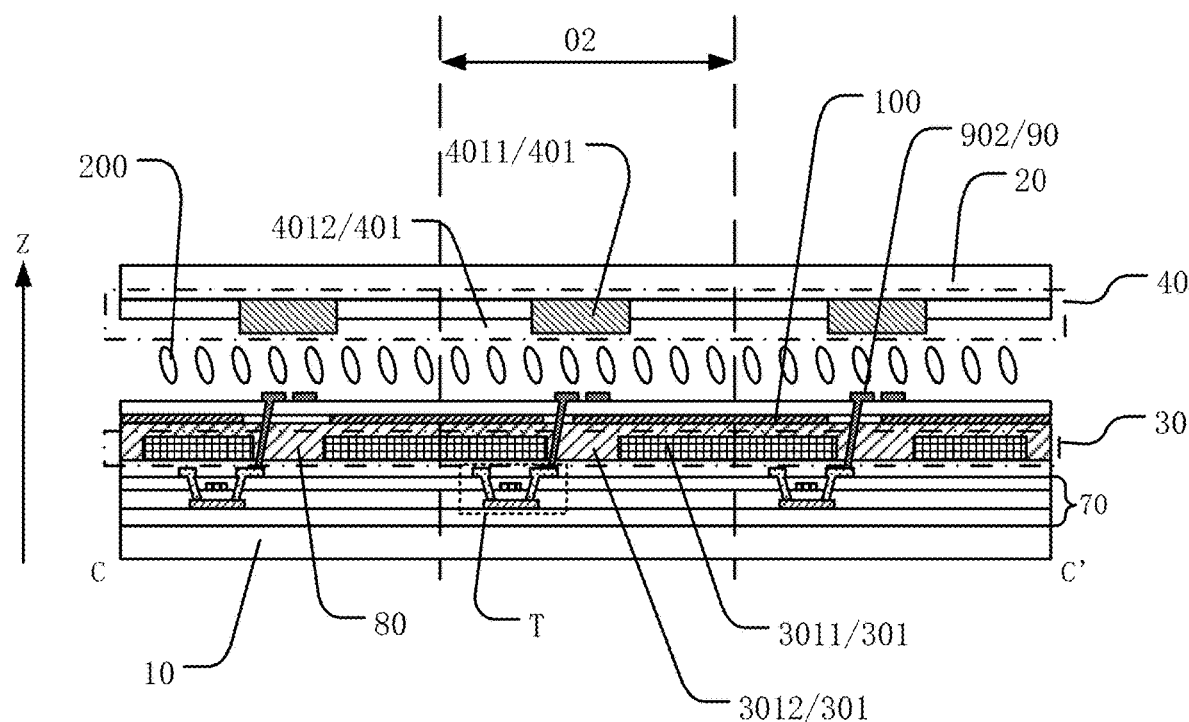
FIG. 24 illustrates another cross-sectional structural schematic along a C-C' direction in FIG. 10.

In some optional embodiments, referring to FIGS. 10 and 24, FIG. 24 illustrates another cross-sectional structural schematic along a C-C' direction in FIG. 10. In one embodiment, the first light-blocking layer 30 may be on the side of the planarization layer 80 adjacent to the first substrate 10. Optionally, the structure at the side of the first substrate 10 facing the second substrate 20 within the range of the pixel unit 00 in one embodiment may refer to FIG. 22; and the structure at the side the second substrate 20 facing the first substrate 10 within the range of the pixel unit 00 may refer to FIG. 23.

In one embodiment, it may describe that the side of the first substrate 10 facing the second substrate 20 may further include the thin film transistor array layer 70, the planarization layer 80, and the pixel electrode layer 90; the thin film transistor array layer 70 may be on one side of the first substrate 10; the planarization layer 80 may be on the side of the thin film transistor array layer 70 away from the first substrate 10; and the pixel electrode layer 90 may be on the side of the thin film transistor array layer 70 away from the first substrate 10. The display panel 000 in one embodiment may further include the common electrode layer 100. In FIG. 24, the common electrode layer 100 may only be located on the side of the pixel electrode layer 90 adjacent to the planarization layer 80 as an example for illustration. During an implementation, the common electrode layer 100 may also be located at other positions, which may not be limited in one embodiment. In one embodiment, the first light-blocking layer 30 may be located on the side of the planarization layer 80 adjacent to the first substrate 10, that is, the first light-blocking layer 30 may be located between the planarization layer 80 and the thin film transistor array layer 70. Therefore, the distance between the first light-blocking layer 30 and the second light-blocking layer 40 may be increased by the planarization layer 80 having a certain thickness, which may avoid that the distance between the first light-blocking layer 30 and the second light-blocking layer 40 is too small to affect the on-state effect at the oblique viewing angle. In such way, the highlighted pixel region 02 viewed from the oblique viewing angle may have sufficiently strong on-state light, thereby ensuring the anti-peep effect.

Figure 25:
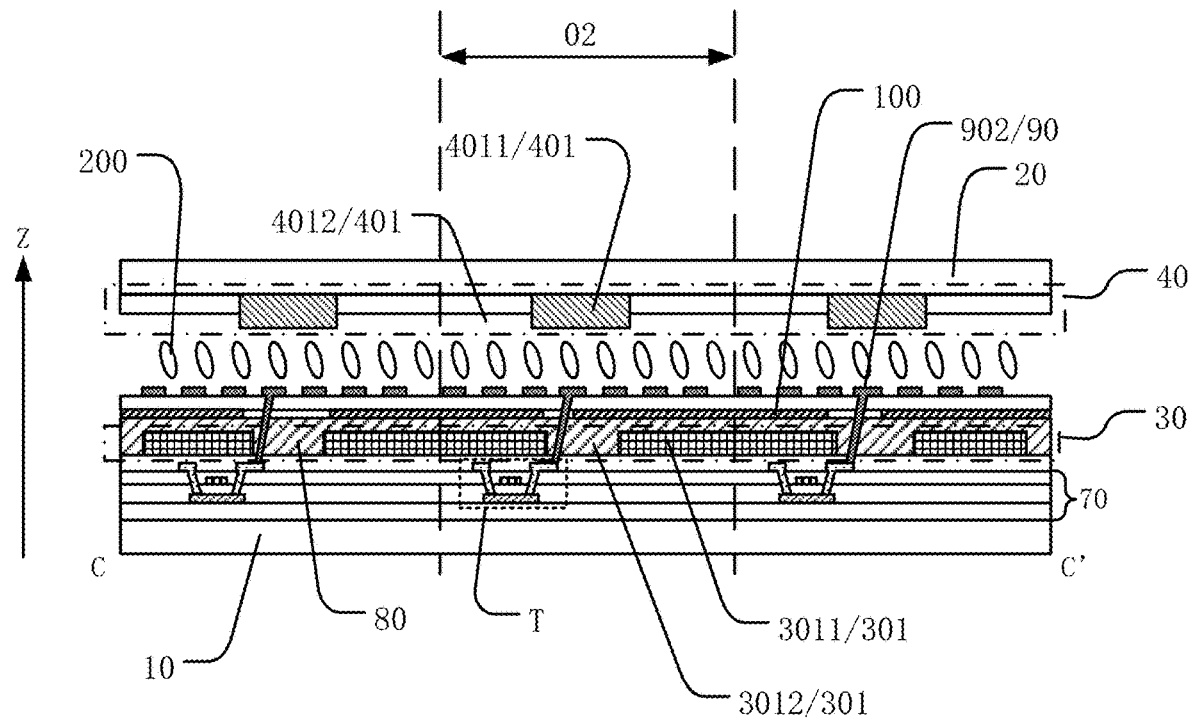
FIG. 25 illustrates another cross-sectional structural schematic along a C-C' direction in FIG. 10.
Figure 26:
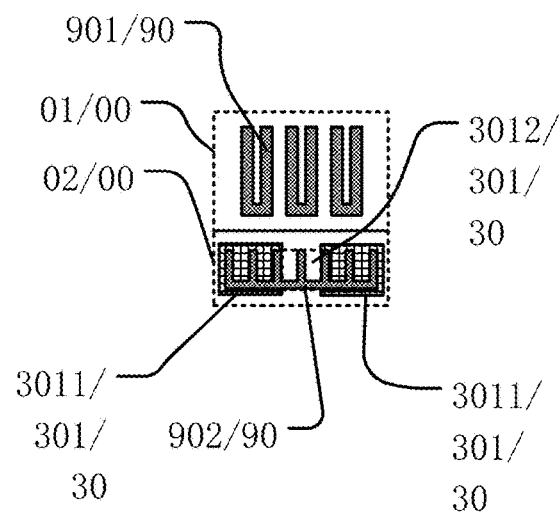
FIG. 26 illustrates another structural schematic of a side view of the first substrate facing the second substrate within a range of the pixel unit in FIG. 10.

Optionally, referring to FIG. 10 and FIGS. 25-26, FIG. 25 illustrates another cross-sectional structural schematic along a C-C' direction in FIG. 10; and FIG. 26 illustrates a structural schematic of a side view of the first substrate facing the second substrate within the range of the pixel unit in FIG. 10. In one embodiment, the structure of the side of the second substrate 20 facing the first substrate 10 within the range of the pixel unit 00 may refer to FIG. 23. In one embodiment, the orthographic projection of the second pixel electrode 902 onto the first substrate 10 may overlap the orthographic projections of both the first opening 3012 and the first sub-portion 3011 onto the first substrate 10, that is, the second pixel electrode 902 may be disposed within entire highlighted pixel region 02. In one embodiment, the first light-blocking layer 30 is located on the side of the planarization layer 80 adjacent to the first substrate 10, that is, the first light-blocking layer 30 is closer to the first substrate 10 than the planarization layer 80. Therefore, on the side of the first substrate 10, when the side of the pixel electrode layer 90 away from the first substrate 10 is not disposed with other light-blocking structures, the second pixel electrode 902 may be fabricated as large as possible. For example, the second pixel electrode 902 may be disposed in entire highlighted pixel region 02. Therefore, along the direction perpendicular to the light-exiting surface of the display panel, the orthographic projection of the second pixel electrode 902 onto the first substrate 10 may not only overlap the orthographic projections of both the first opening 3012 and the first substrate 10; and the orthographic projection of the second pixel electrode 902 onto the first substrate 10 may also overlap the orthographic projection of the first sub-portion 3011 onto the first substrate 10, which may be beneficial for enhancing the facing area between the second pixel electrode 902 of the highlighted pixel region 02 and the common electrode layer 100 and further be beneficial for increasing the electric field intensity for driving the liquid crystal layer 200 and improving the display effect of the highlighted pixel region 02.

Figure 27:
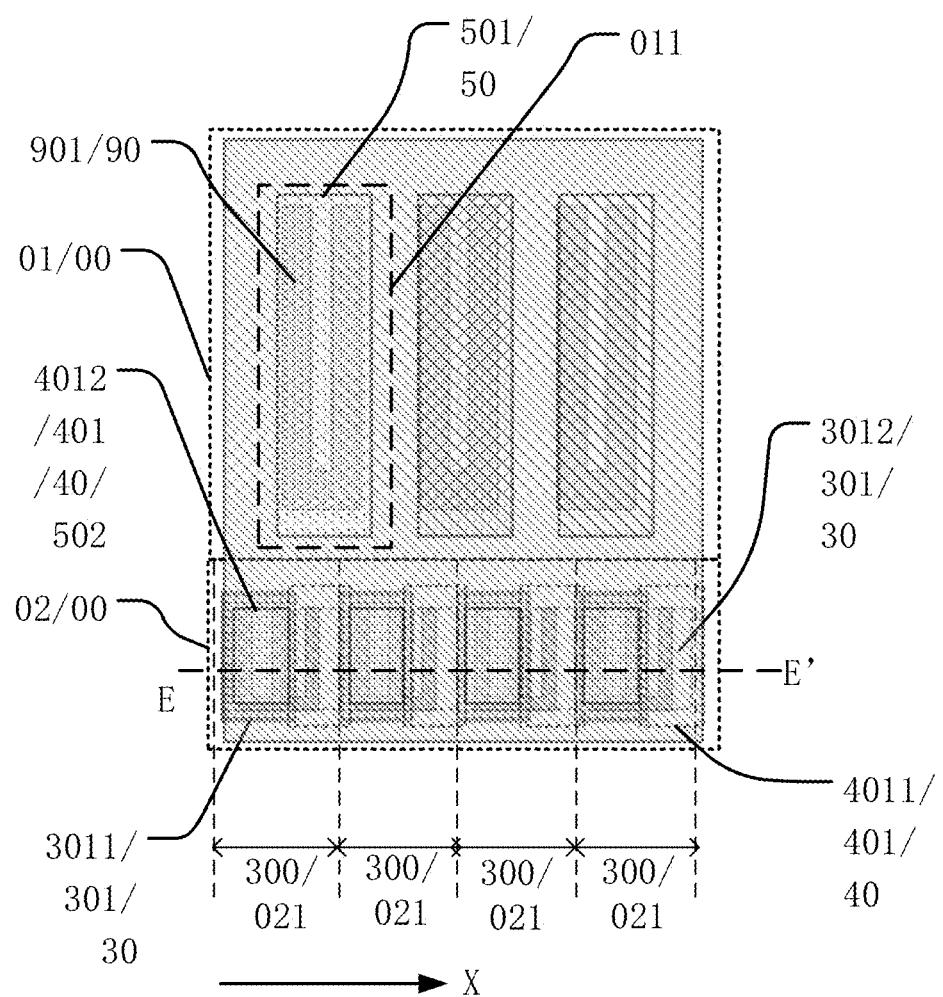
FIG. 27 illustrates a plan structural schematic of an exemplary pixel unit according to various embodiments of the present disclosure.
Figure 28:
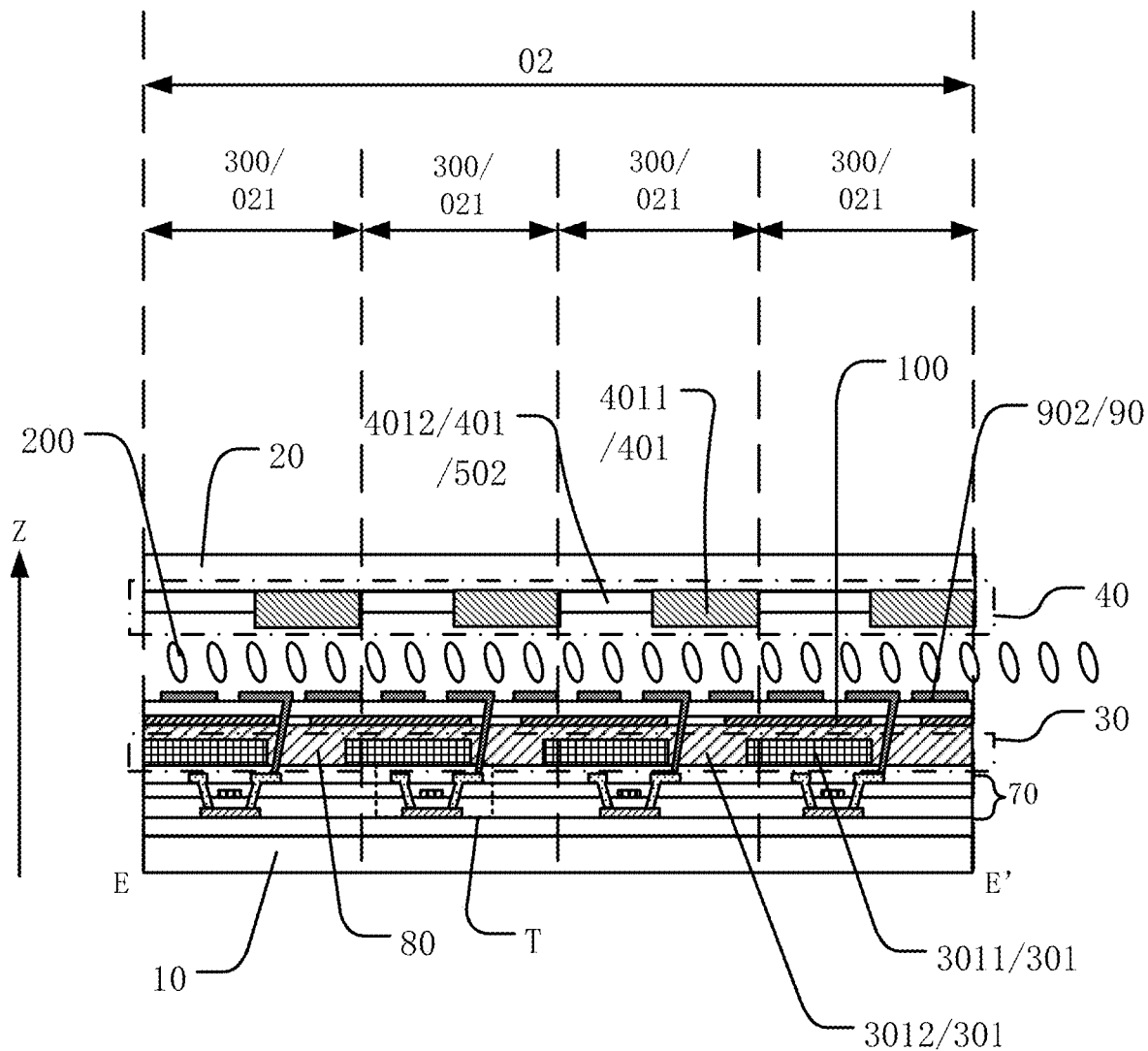
FIG. 28 illustrates a cross-sectional structural schematic along a E-E' direction in FIG. 27.
Figure 29:
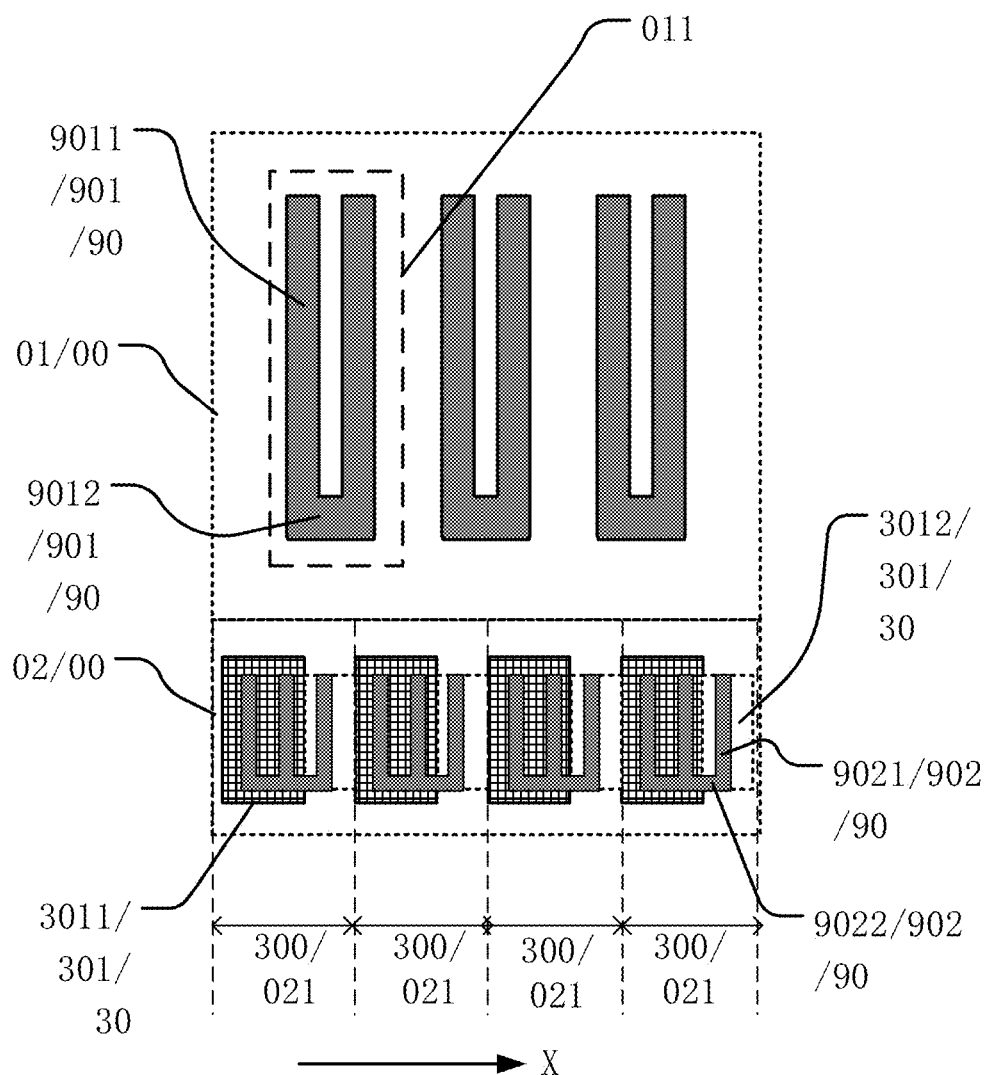
FIG. 29 illustrates a structural schematic of a side view of the first substrate facing the second substrate in FIG. 27.
Figure 30:
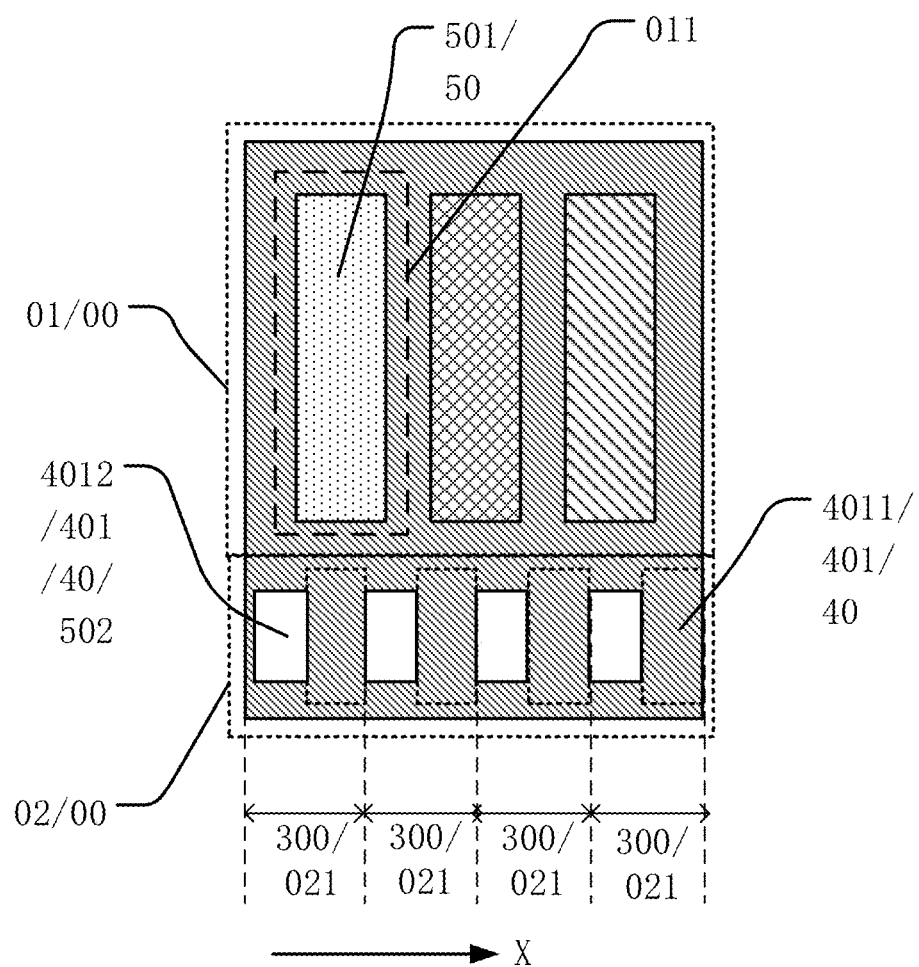
FIG. 30 illustrates a structural schematic of a side view of the second substrate facing the first substrate in FIG. 27.

In some optional embodiments, referring to FIGS. 27-30, FIG. 27 illustrates a plan structural schematic of an exemplary pixel unit according to various embodiments of the present disclosure; FIG. 28 illustrates a cross-sectional structural schematic along a E-E' direction in FIG. 27; FIG. 29 illustrates a structural schematic of a side view of the first substrate facing the second substrate in FIG. 27; and FIG. 30 illustrates a structural schematic of a side view of the second substrate facing the first substrate in FIG. 27 (it can be understood that, to clearly illustrate the structure in one embodiment, transparency fill may be performed in FIG. 27). In one embodiment, one highlighted pixel region 02 may include a plurality of highlighted sub-pixels 300 (in FIGS. 27-30, one highlighted pixel region 02 may only include four highlighted sub-pixels 300 as an example for illustration); and one highlighted pixel region 02 may include a plurality of second pixel electrodes 902.

One second pixel electrode 902 may correspond to one highlighted sub-pixel 300.

In one embodiment, it may describe that the plurality of highlighted sub-pixels 300 may be disposed in one highlighted pixel region 02; one side of the first substrate 10 within the range of one highlighted sub-pixel 300 may include one first sub-portion 3011 and one first opening 3012; one side of the second substrate 20 within the range of one highlighted sub-pixel 300 may include one second sub-portion 4011 and one light-transmitting portion 502 fitted into one second opening 4012. In one embodiment, one highlighted pixel region 02 may include a plurality of second pixel electrodes 902. That is, the plurality of second pixel electrodes 902 may be disposed in one highlighted pixel region 02 of the pixel unit 00, and one second pixel electrode 902 may correspond to one highlight sub-pixel 300. Optionally, as shown in FIGS. 27-30, one second pixel electrode 902 may correspond to one highlighted sub-pixel 300, one highlighted sub-pixel 300 may correspond to one thin film transistor T, one thin film transistor T may be electrically connected to one second pixel electrode 902, and the second pixel electrode 902 may be disposed in the first opening 3012 (may not be shown in FIGS. 27-30 in one embodiment and may be understood with reference to embodiments shown in FIG. 22). Or the orthographic projection of the second pixel electrode 902 onto the first substrate 10 may not only overlap the orthographic projections of both the first opening 3012 and the first substrate 10; the orthographic projection of the second pixel electrode 902 onto the first substrate 10 may also overlap the orthographic projection of the first sub-portion 3011 onto the first substrate 10 (as shown in FIG. 29); and the plurality of second pixel electrodes 902 in one highlighted pixel region 02 may be controlled by different thin film transistors T. Therefore, it is beneficial to realize the separate control of different highlighted sub-pixels 300 within the range of the highlighted pixel region 02, and further realize the separate control of the sub-regions of the highlighted pixel region 02, thereby implementing the sub-region anti-peep function.

It should be noted that, in one embodiment, it may exemplarily illustrate the electrical connection manner between the thin film transistor T and the pixel electrode of the pixel electrode layer 90; and in an implementation, it may include, but not be limited to, such connection manner. The thin film transistor T may be electrically connected to the pixel electrode of the pixel electrode layer 90 by directly punching holes, or the thin film transistor T may also be electrically connected to the pixel electrode of the pixel electrode layer 90 by changing layers and punching holes (for example, when a plurality of insulating layers are included between the pixel electrode layer 90 and the film layer of the thin film transistor T), which may not be limited in one embodiment as long as the electrical connection between thin film transistor T and the pixel electrode of the pixel electrode layer 90 is achieved to transmit electrical signals.

Figure 31:
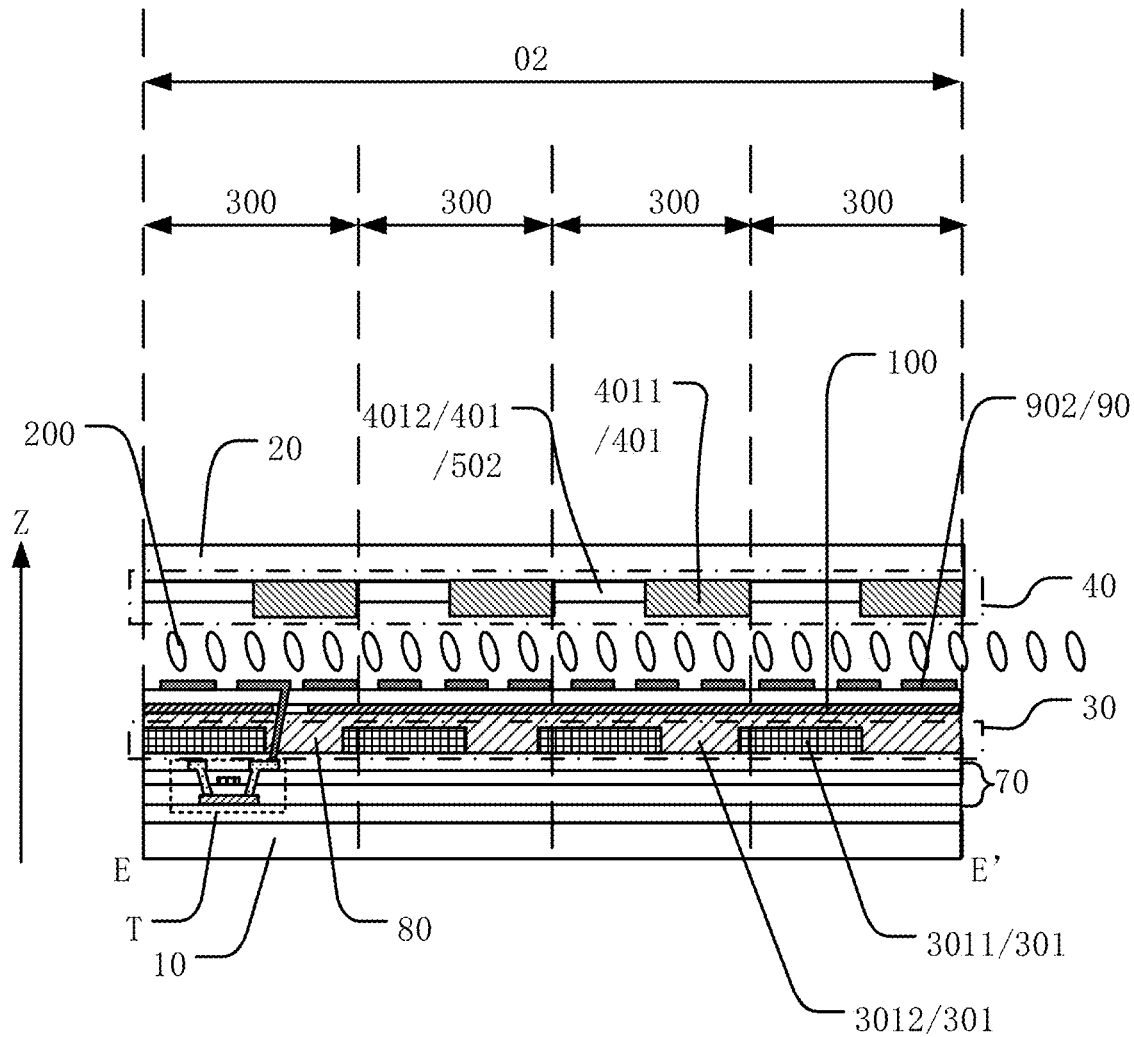
FIG. 31 illustrates another cross-sectional structural schematic along a E-E' direction in FIG. 27.
Figure 32:
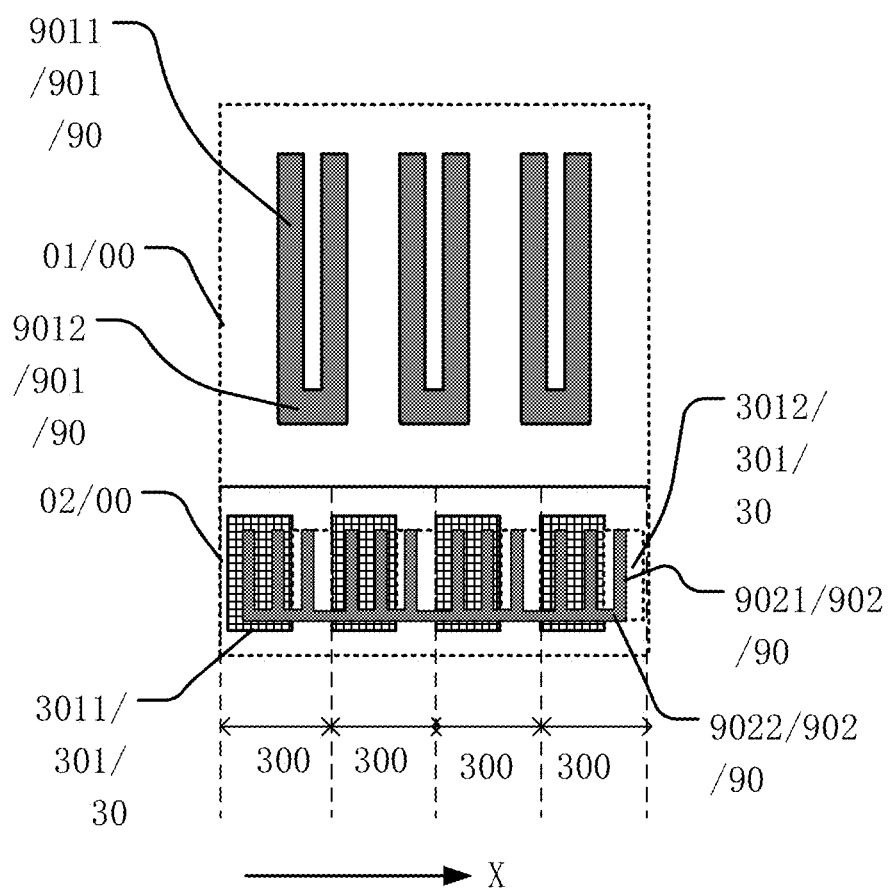
FIG. 32 illustrates another structural schematic of a side view of the first substrate facing the second substrate in FIG. 27.

In some optional embodiments, referring to FIGS. 27 and FIGS. 31-32, FIG. 31 illustrates another cross-sectional structural schematic along a E-E' direction in FIG. 27; and FIG. 32 illustrates another structural schematic of a side view of the first substrate facing the second substrate in FIG. 27. The structure of the side of the second substrate 20 facing the first substrate 10 in one embodiment may refer to FIG. 30. In one embodiment, one highlighted pixel region 02 may include a plurality of highlight sub-pixels 300; one highlighted pixel region 02 may include a plurality of second pixel electrodes 902; one second pixel electrode 902 may correspond to one highlighted sub-pixel 300; one highlighted sub-pixel 300 may correspond to one thin film transistor T; and at least two second pixel electrodes 902 in one highlighted pixel region 02 may be connected to each other. Optionally, in FIGS. 31-32, the second pixel electrodes 902 in one highlighted pixel region 02 may be connected in series as an example for illustration, that is, the plurality of highlighted sub-pixels 300 of one highlighted pixel region 02 may be jointly controlled.

Figure 33:
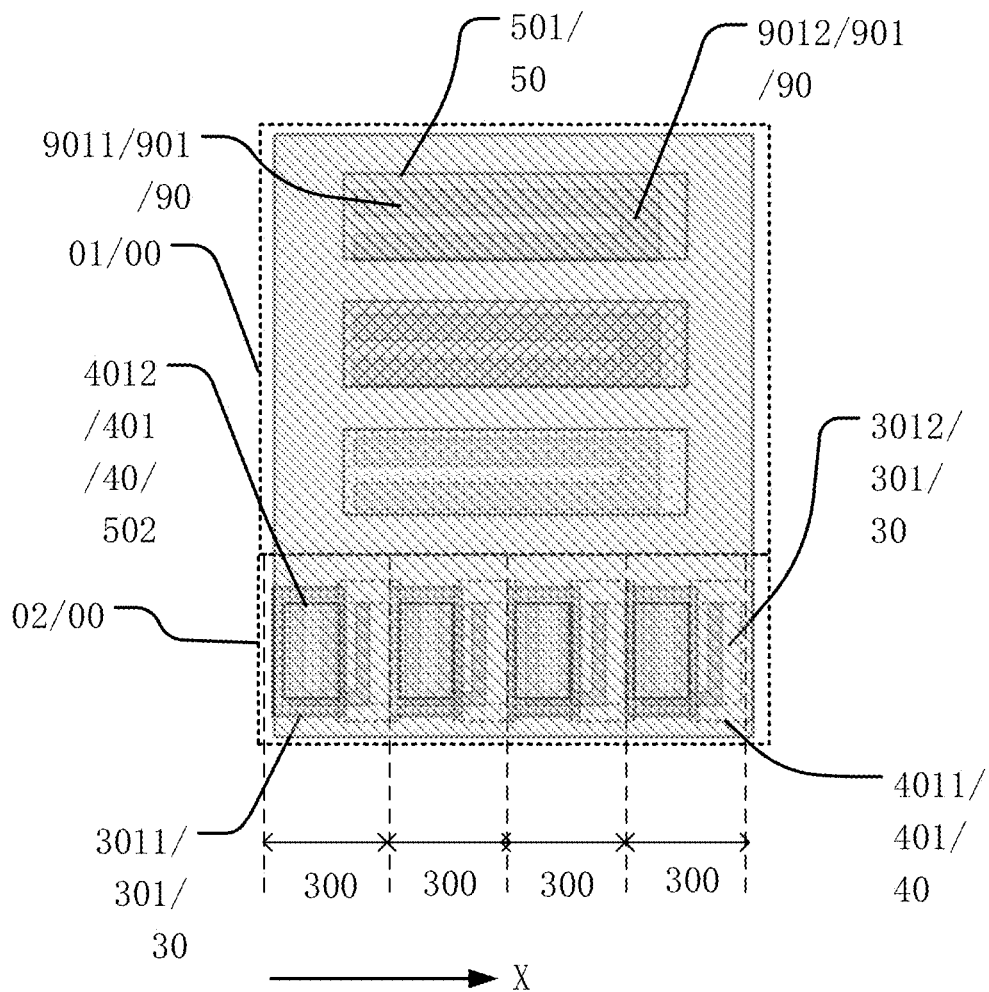
FIG. 33 illustrates another plan structural schematic of an exemplary pixel unit according to various embodiments of the present disclosure.

In one embodiment, it may describe that the plurality of highlighted sub-pixels 300 may be disposed in one highlighted pixel region 02; one side of the first substrate 10 within the range of one highlighted sub-pixel 300 may include one first sub-portion 3011 and one first opening 3012; and one side of the second substrate 20 within the range of one highlighted sub-pixel 300 may include one second sub-portion 4011 and one light-transmitting portion 502 fitted into one second opening 4012. One highlighted pixel region 02 in one embodiment may include the plurality of second pixel electrodes 902. That is, the plurality of second pixel electrodes 902 may be disposed in one highlighted pixel region 02 of the pixel unit 00, and one second pixel electrode 902 may correspond to one highlighted sub-pixel 300. Optionally, as shown in FIGS. 31-32, one second pixel electrode 902 may correspond to one highlighted sub-pixel 300, and one second pixel electrode 902 may be disposed in one first opening 3012 (not shown in FIGS. 31-33 and may be understood with reference to embodiments shown in FIG. 22). Or the orthographic projection of the second pixel electrode 902 onto the first substrate 10 may not only overlap the orthographic projections of both the first opening 3012 and the first substrate 10 and overlap the orthographic projection of the first sub-portion 3011 onto the first substrate 10 (as shown in FIG. 32); and in the plurality of second pixel electrodes 902 in one highlighted pixel region 02, at least two second pixel electrodes 902 may be disposed to be connected to each other, that is, at least two highlighted sub-pixels 300 in one highlighted pixel region 02 may be jointly controlled. Or in the plurality of second pixel electrodes 902 in one highlighted pixel region 02, all second pixel electrodes 902 may be disposed to be connected to each other, that is, all highlighted sub-pixels 300 in one highlighted pixel region 02 may be jointly controlled. At this point, only one thin film transistor T may need to be connected to the second pixel electrode 902 in series in the highlighted pixel region 02, which may be also beneficial for reducing the number of thin film transistors on the first substrate 10, thereby improving the light transmittance and reducing the process difficulty.

It should be noted that, in one embodiment, it may exemplarily illustrate the electrical connection manner between the thin film transistor T and the pixel electrode of the pixel electrode layer 90; and during an implementation, the manner may include, but not be limited to, such connection manner. The thin film transistor T may be electrically connected to the pixel electrode of the pixel electrode layer 90 by directly punching holes, or the thin film transistor T may also be electrically connected to the pixel electrode of the pixel electrode layer 90 by changing layers and punching holes (for example, when a plurality of insulating layers are included between the pixel electrode layer 90 and the film layer of the thin film transistor T), which may not be limited in one embodiment as long as the electrical connection between thin film transistor T and the pixel electrode of the pixel electrode layer 90 is achieved to transmit electrical signals.

In some optional embodiments, referring to FIGS. 27-32, the first pixel electrode 901 in one embodiment may be a comb-shaped structure; the first pixel electrode 901 may include at least two strip-shaped first sub-portions 9011 and one first connecting portion 9012; and ends of the first sub-portions 9011 may be connected to each other through the first connecting portion 9012.

The second pixel electrode 902 may be a comb-shaped structure; the second pixel electrode 902 may include at least two strip-shaped second sub-portions 9021 and one second connecting portion 9022; and ends of the second sub-portions 9021 may be connected to each other through the second connecting portion 9022.

In one embodiment, it may describe that the first pixel electrode 901 and the second pixel electrode 902 disposed in the pixel electrode layer 90 in the display panel 000 may both be comb-shaped structures. The first pixel electrode 901 may include at least two strip-shaped first sub-portions 9011 and one first connecting portion 9012; ends of the at least two strip-shaped first sub-portions 9011 may be connected to each other through one first connecting portion 9012; and a slit may be formed between at least two strip-shaped first sub-portions 9011. The second pixel electrode 902 may include at least two strip-shaped second sub-portions 9021 and one second connecting portion 9022; ends of the at least two strip-shaped second sub-portions 9021 may be connected to each other through one second connecting portion 9022; and a slit may be formed between at least two strip-shaped second sub-portions 9021. In one embodiment, each pixel electrode of the pixel electrode layer 90 may be configured as the comb-like structure including the slit, so that the pixel electrode and the common electrode layer 100 may not only form a vertical electric field along the direction E perpendicular to the light-exiting surface of the display panel, but also form a lateral edge electric field between each of the strip-shaped first sub-portion 9011 and the strip-shaped second sub-portion 9021 and the common electrode layer 100. That is, a multi-dimensional electric field may be generated between the pixel electrode layer 90 and the common electrode layer 100, which may be beneficial for improving the deflection effect of the liquid crystal molecules of the liquid crystal layer 200.

It should be noted that, in one embodiment, the formation materials of the pixel electrode layer 90 and the common electrode layer 100 may be transparent conductive materials, such as indium tin oxide (ITO) and other materials, which may be beneficial for the formation of the driving electric field and may avoid affecting the transmittance of the display panel 000.

It can be understood that, in one embodiment, the number of first sub-portions 9011 included in one first pixel electrode 901 and the number of second sub-portions 9021 included in one second pixel electrode 902 may not be limited. In FIGS. 27-32, the first pixel electrode 901 may exemplarily include two first sub-portions 9011 for illustration, which may not be limited in one embodiment and may be selected according to actual needs in an implementation.

In some optional embodiments, referring to FIGS. 27-32, along the direction X in parallel with the plane of the first substrate 10 in one embodiment, the length extension direction of the first sub-portion 9011 may be same as the length extension direction of the second sub-portion 9021.

In one embodiment, it may describe that the arrangement direction of the plurality of first pixel electrodes 901 in the color pixel region 01 may be same as the arrangement direction of the plurality of second pixel electrodes 902 in the highlighted pixel region 02. That is, along the direction X in parallel with the plane of the first substrate 10, the length extension direction of the first sub-portion 9011 may be same as the length extension direction of the second sub-portion 9021, so that the anti-peep direction of the display panel 000 may be the horizontal direction in FIGS. 27-32. That is, the anti-peep direction of the display panel 000 maybe same as the arrangement direction of the plurality of first pixel electrodes 901, so that it may realize the anti-peep display effect that the viewer may not view the display picture of the display panel on the left and right sides along the horizontal direction FIGS. 27-32 and may only view white light.

Figure 34:
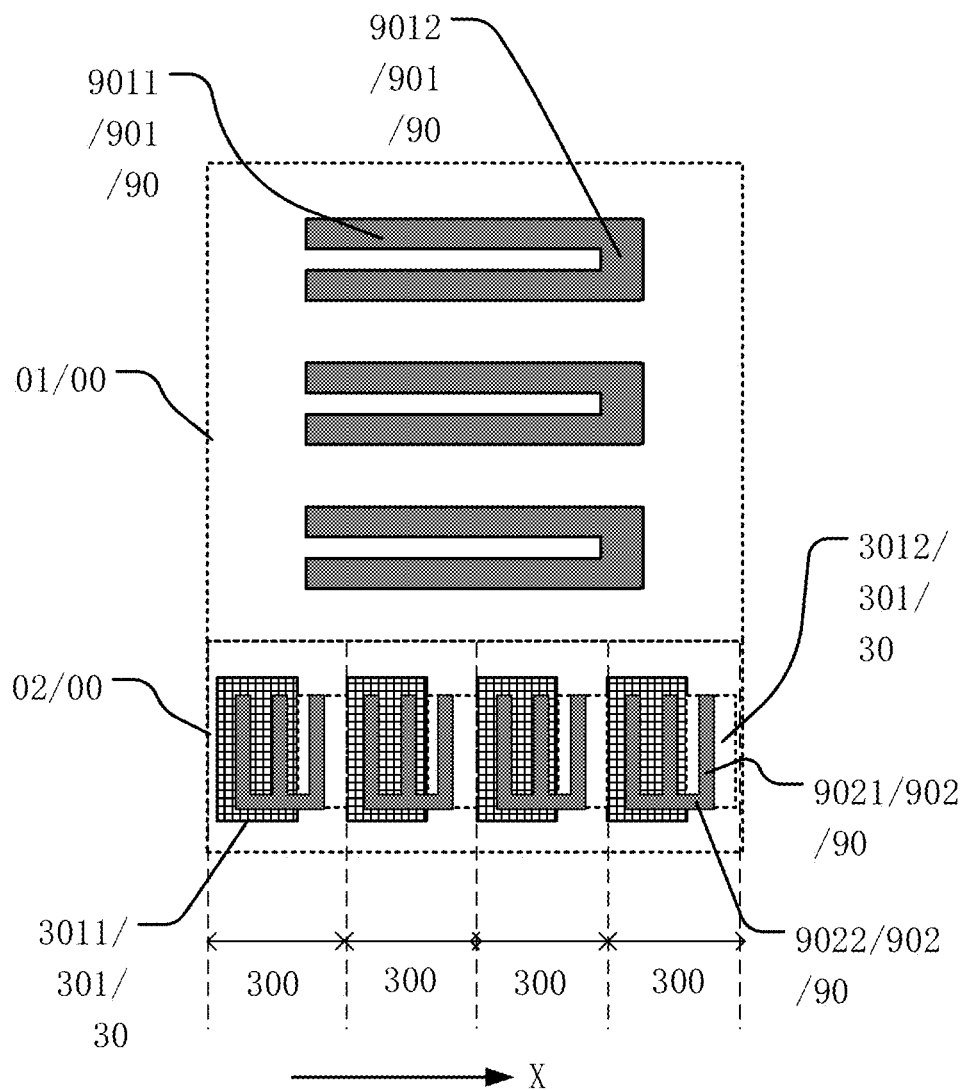
FIG. 34 illustrates a structural schematic of a side view of the first substrate facing the second substrate in FIG. 33.
Figure 35:
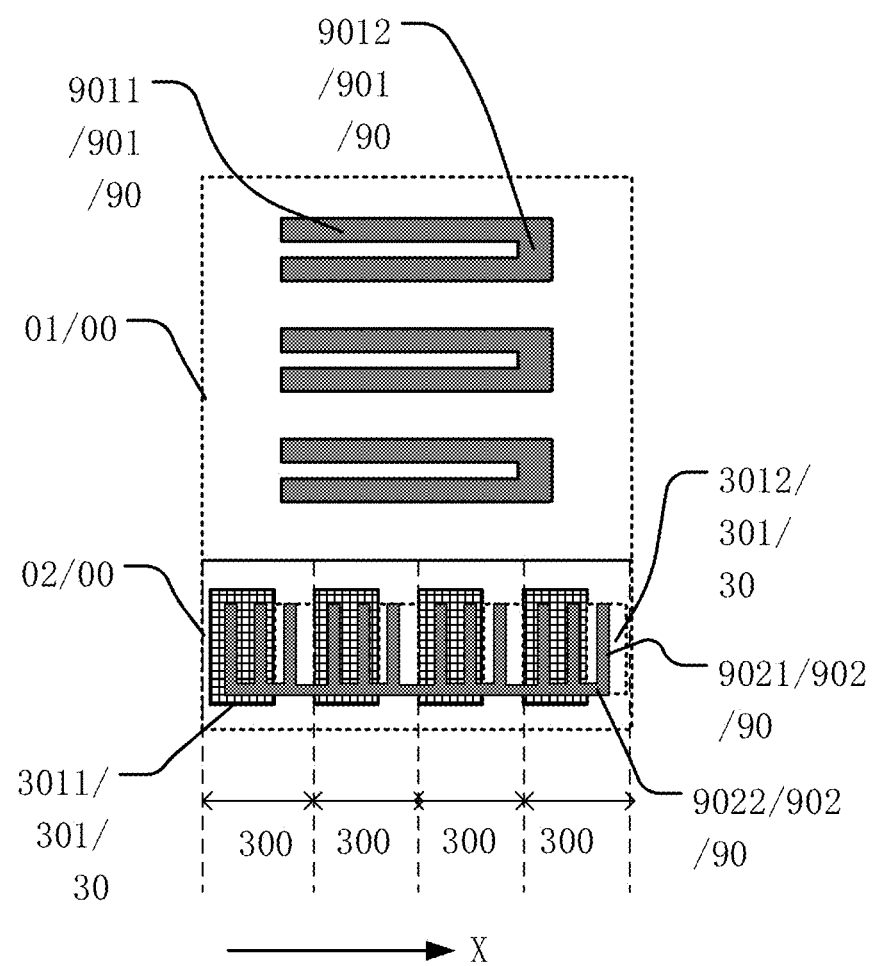
FIG. 35 illustrates another structural schematic of a side view of the first substrate facing the second substrate in FIG. 33.
Figure 36:
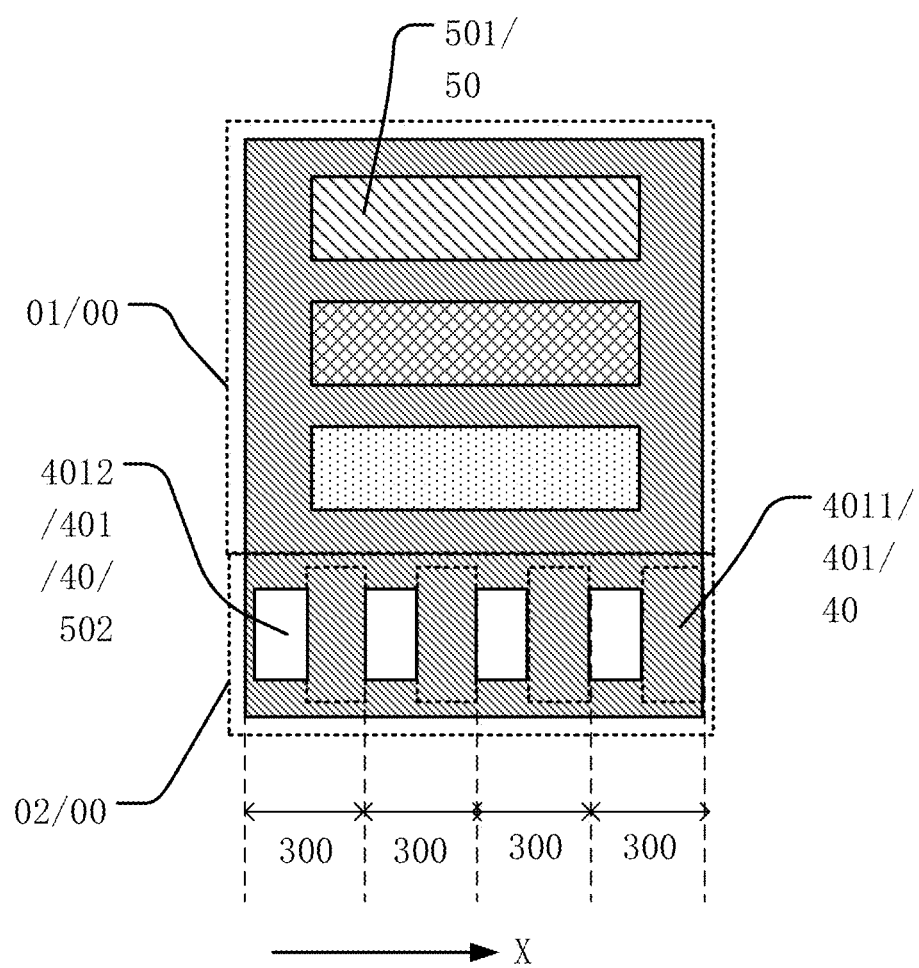
FIG. 36 illustrates a structural schematic of a side view of the second substrate facing the first substrate in FIG. 33.

In some optional embodiments, referring to FIGS. 33-36, FIG. 33 illustrates another plan structural schematic of an exemplary pixel unit according to various embodiments of the present disclosure; FIG. 34 illustrates a structural schematic of a side view of the first substrate facing the second substrate in FIG. 33; FIG. 35 illustrates another structural schematic of a side view of the first substrate facing the second substrate in FIG. 33; and FIG. 36 illustrates a structural schematic of a side view of the second substrate facing the first substrate in FIG. 33 (it can be understood that, to clearly illustrate the structure in one embodiment, transparency fill may be performed in FIG. 33). In one embodiment, along the direction X in parallel with the plane where the first substrate 10 is located, the length extension direction of the first sub-portion 9011 may intersect the length extension direction of the second sub-portion 9021.

In one embodiment, it may describe that the arrangement direction of the plurality of first pixel electrodes 901 in the color pixel region 01 may be different from the arrangement direction of the plurality of second pixel electrodes 902 in the highlighted pixel region 02. Optionally, along the direction X in parallel with the plane of the first substrate 10, the length extension direction of the first sub-portion 9011 may intersect or be perpendicular to the length extension direction of the second sub-portion 9021 (as shown in FIGS. 33-36), such that the anti-peep direction of the display panel 000 may be the horizontal direction in FIGS. 33-36. That is, the anti-peep direction of the display panel 000 may intersect or be perpendicular to the arrangement direction of the plurality of first pixel electrodes 901, so that it may realize the anti-peep display effect that the viewer may not view the display picture of the display panel on the left and right sides along the horizontal direction FIGS. 27-32 and may only view white light.

Figure 37:
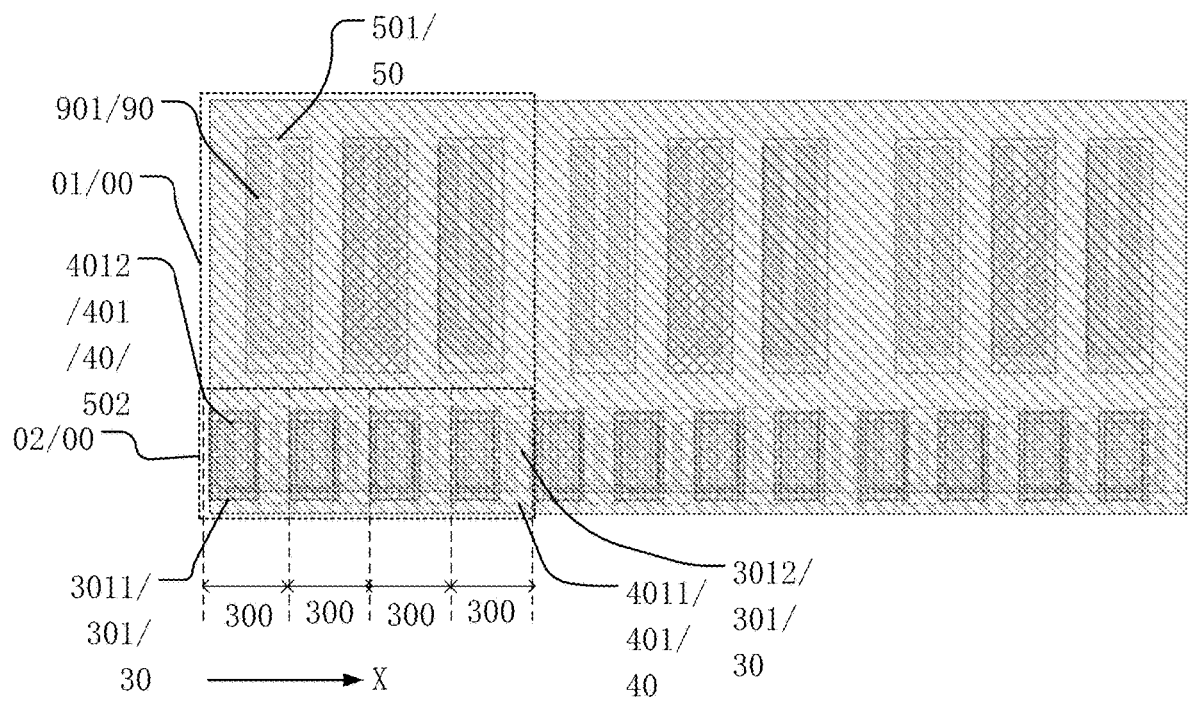
FIG. 37 illustrates a plan structural schematic of a plurality of pixel units according to various embodiments of the present disclosure.
Figure 38:
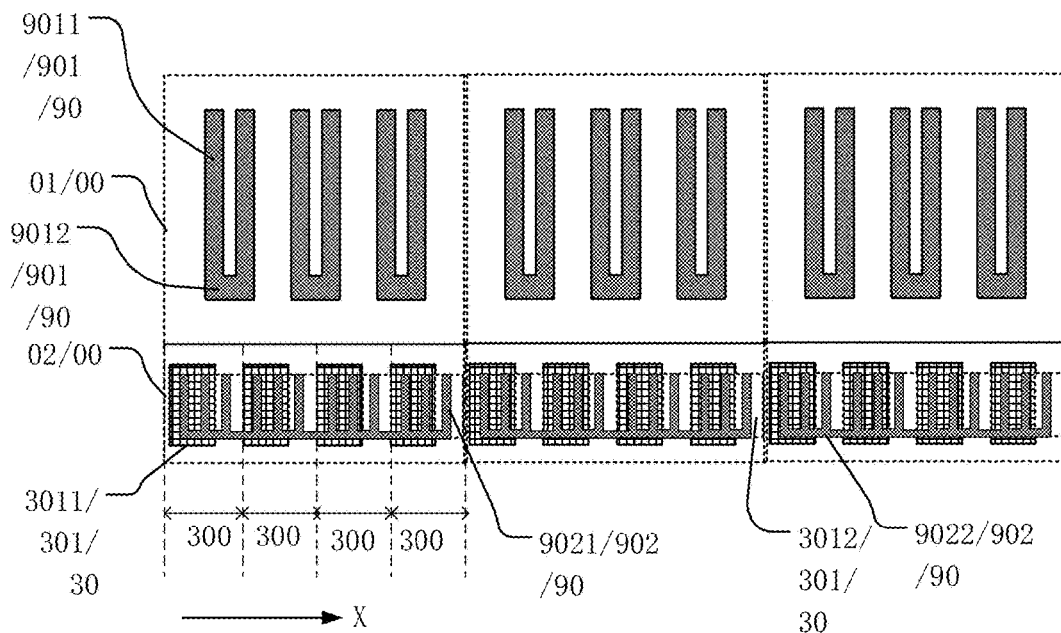
FIG. 38 illustrates a structural schematic of a side view of the first substrate facing the second substrate in FIG. 37.
Figure 39:
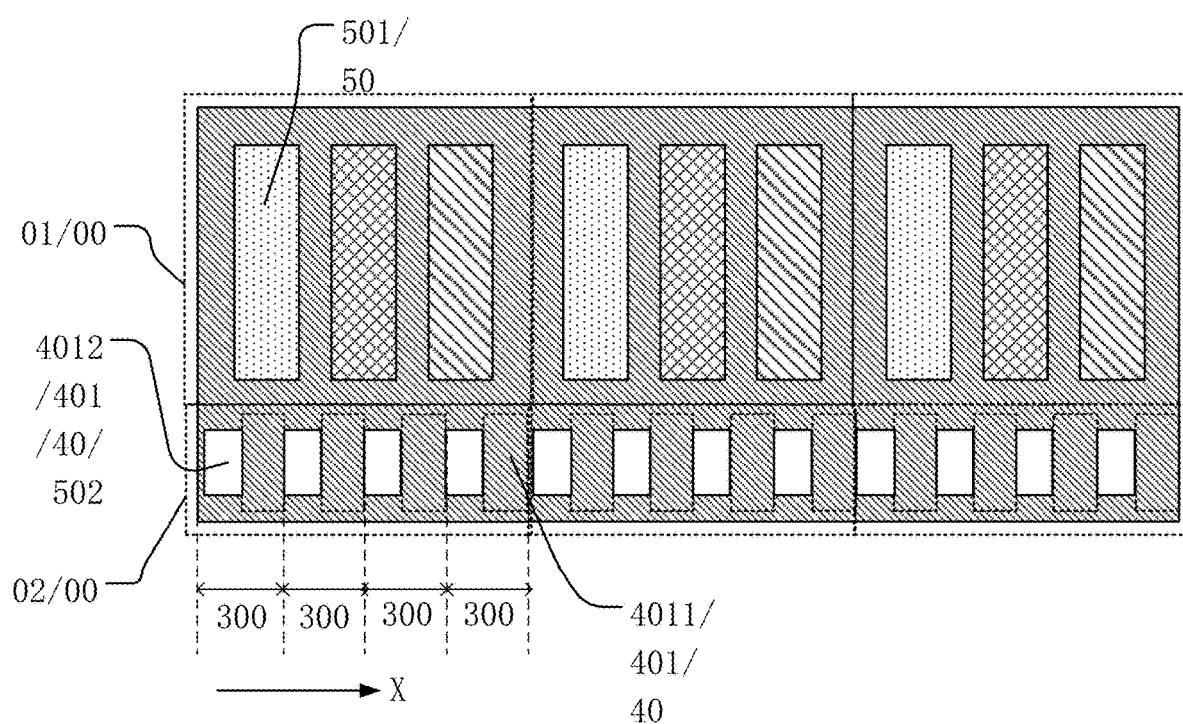
FIG. 39 illustrates a structural schematic of a side view of the second substrate facing the first substrate in FIG. 37.

In some optional embodiments, referring to FIGS. 37-39, FIG. 37 illustrates a plan structural schematic of a plurality of pixel units according to various embodiments of the present disclosure; FIG. 38 illustrates a structural schematic of a side view of the first substrate facing the second substrate in FIG. 37; and FIG. 39 illustrates a structural schematic of a side view of the second substrate facing the first substrate in FIG. 37. In one embodiment, in the plurality of pixel units 00 of the display panel 000 (only three pixel units 00 are only shown in FIGS. 37-39, which may include, but not be limited, to such number), the second pixel electrodes 902 at different highlighted pixel regions 02 may be independent from each other.

In one embodiment, it may describe that, in the plurality of pixel units 00 of the display panel 000, the second pixel electrodes 902 of the highlighted pixel regions 02 of different pixel units 00 may not be connected to each other. That is, the second pixel electrodes 902 at different highlighted pixel regions 02 may be independent of each other. Optionally, one highlight pixel region 02 may only have one second pixel electrode 902; or one highlighted pixel region 02 may also include a plurality of second pixel electrodes 902, which may not be limited in one embodiment. Therefore, the highlighted pixel regions 02 of different pixel units 00 may be individually controlled by different thin film transistors, respectively, to realize independent adjustment of different highlighted pixel regions 02, which may be beneficial for implementing different brightness of different pixel units 00 at the oblique viewing angle and may meet different needs of users and optimize the anti-peep display effect.

Figure 40:
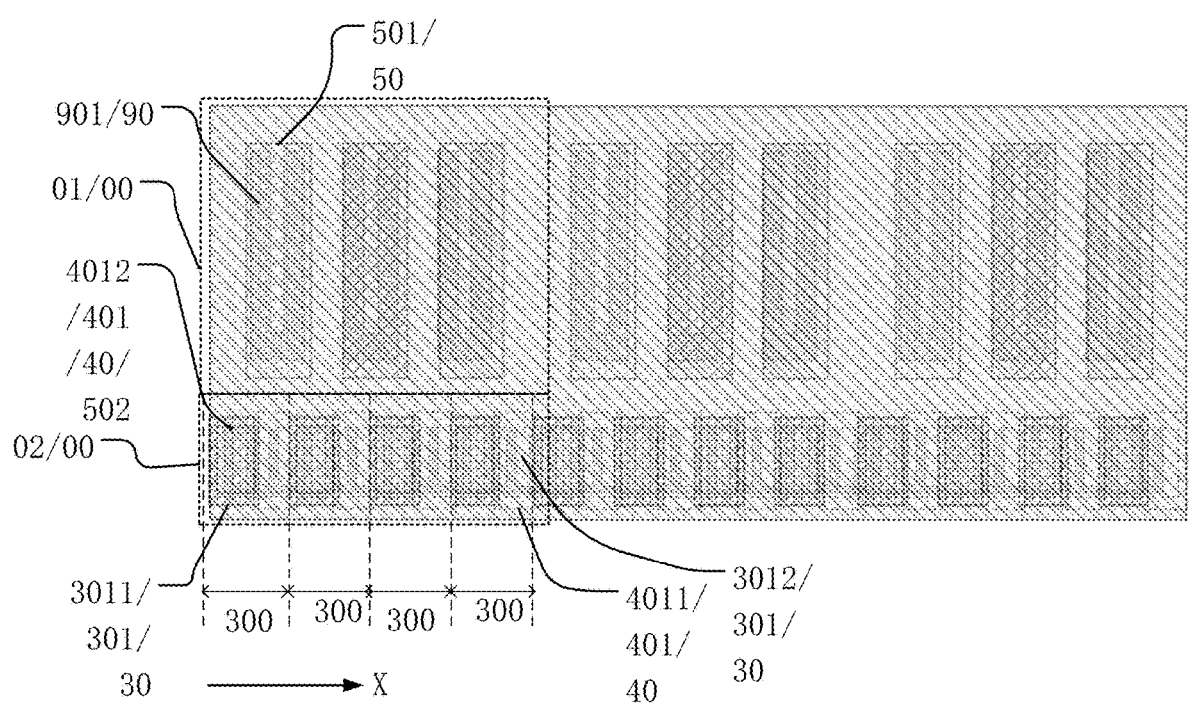
FIG. 40 illustrates another plan structural schematic of a plurality of pixel units according to various embodiments of the present disclosure.
Figure 41:
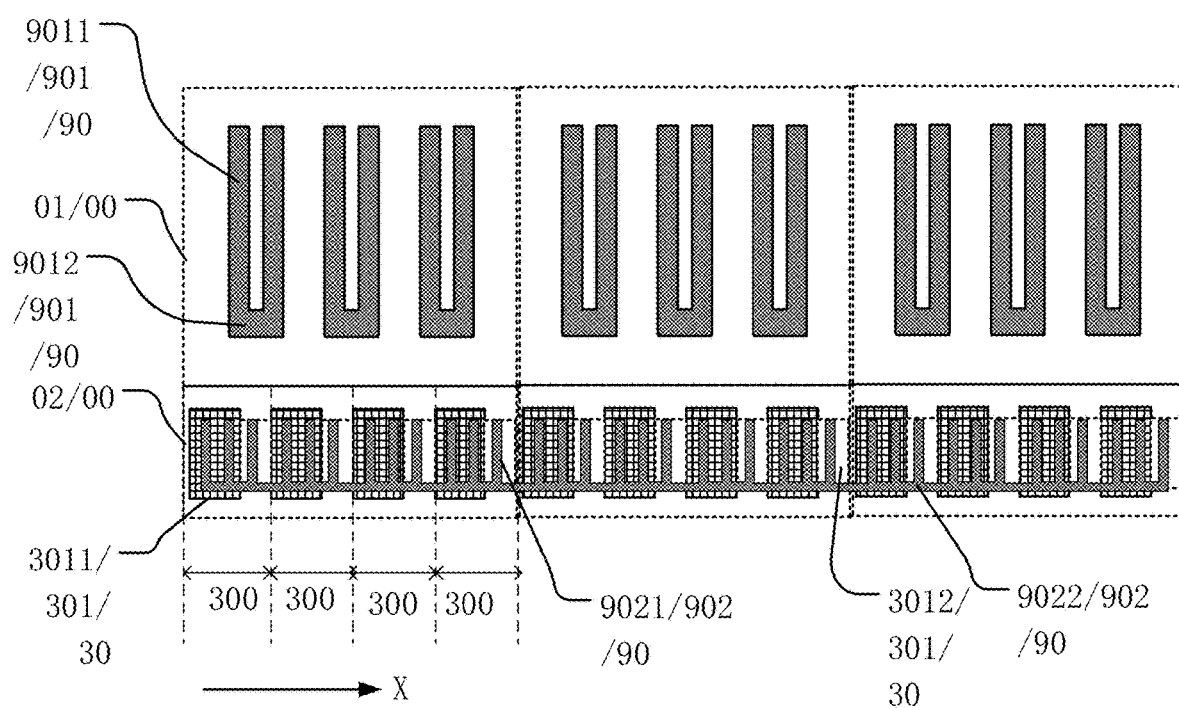
FIG. 41 illustrates a structural schematic of a side view of the first substrate facing the second substrate in FIG. 40.

In some optional embodiments, referring to FIGS. 40-41, FIG. 40 illustrates another plan structural schematic of a plurality of pixel units according to various embodiments of the present disclosure; and FIG. 41 illustrates a structural schematic of a side view of the first substrate facing the second substrate in FIG. 40 (it can be understood that to clearly illustrate the structure in one embodiment, transparency fill may be performed in FIG. 40). The structure of the second substrate 20 facing the side of the first substrate 10 in one embodiment may be understood with reference to FIG. 39. In one embodiment, in the plurality of pixel units 00 of the display panel 000 (only three pixel units 00 are only shown in FIGS. 37-39, which may include, but not be limited, to such number), the second pixel electrodes 902 at different highlighted pixel regions 02 may be independent from each other.

In one embodiment, it may describe that in the plurality of pixel units 00 of the display panel 000, the second pixel electrodes 902 of the highlighted pixel regions 02 of different pixel units 00 may be connected to each other. That is, the second pixel electrodes 902 at different highlighted pixel regions 02 may be jointly controlled. Optionally, the second pixel electrodes 902 of the plurality of highlighted pixel regions 02 may be connected into a single piece. To reduce the driving pressure of the thin film transistors, the plurality of second pixel electrodes 902 in the display panel may be controlled to be connected to each other. In one embodiment, one highlighted pixel region 02 may include one second pixel electrode 902, or one highlighted pixel region 02 may further include a plurality of second pixel electrodes 902, which may not be limited in one embodiment. Therefore, the highlighted pixel regions 02 of different pixel units 00 may be jointly controlled as a whole, and the anti-peep effect of the whole picture on the entire display panel 000 may be implemented.

It can be understood that, in one embodiment, the signal lines or thin film transistors that control the highlighted pixel regions 02 may be disposed in the region where the pixel unit 00 is located (e.g., the display region) only for illustration, which may include, but not be limited to, such arrangement manner during an implementation. Optionally, in one embodiment, in the plurality of pixel units 00 of the display panel 000, the second pixel electrodes 902 at different highlighted pixel regions 02 may be connected to each other to form an overall electrode, thereby implementing the overall joint control of the highlighted pixel regions 02 of different pixel units 00. When the anti-peep effect of the entire display panel is realized, the signal lines and/or the thin film transistors electrically connected to the second pixel electrode 902 of the overall structure may also be arranged in the non-display region of the display panel 000, which may avoid affecting the transmittance of the display panel 000 when the signal lines or thin film transistors that control the high-brightness pixel regions 02 are disposed in the display region, and may further be beneficial for improving the display effect at the front viewing angle of the display panel.

Figure 42:
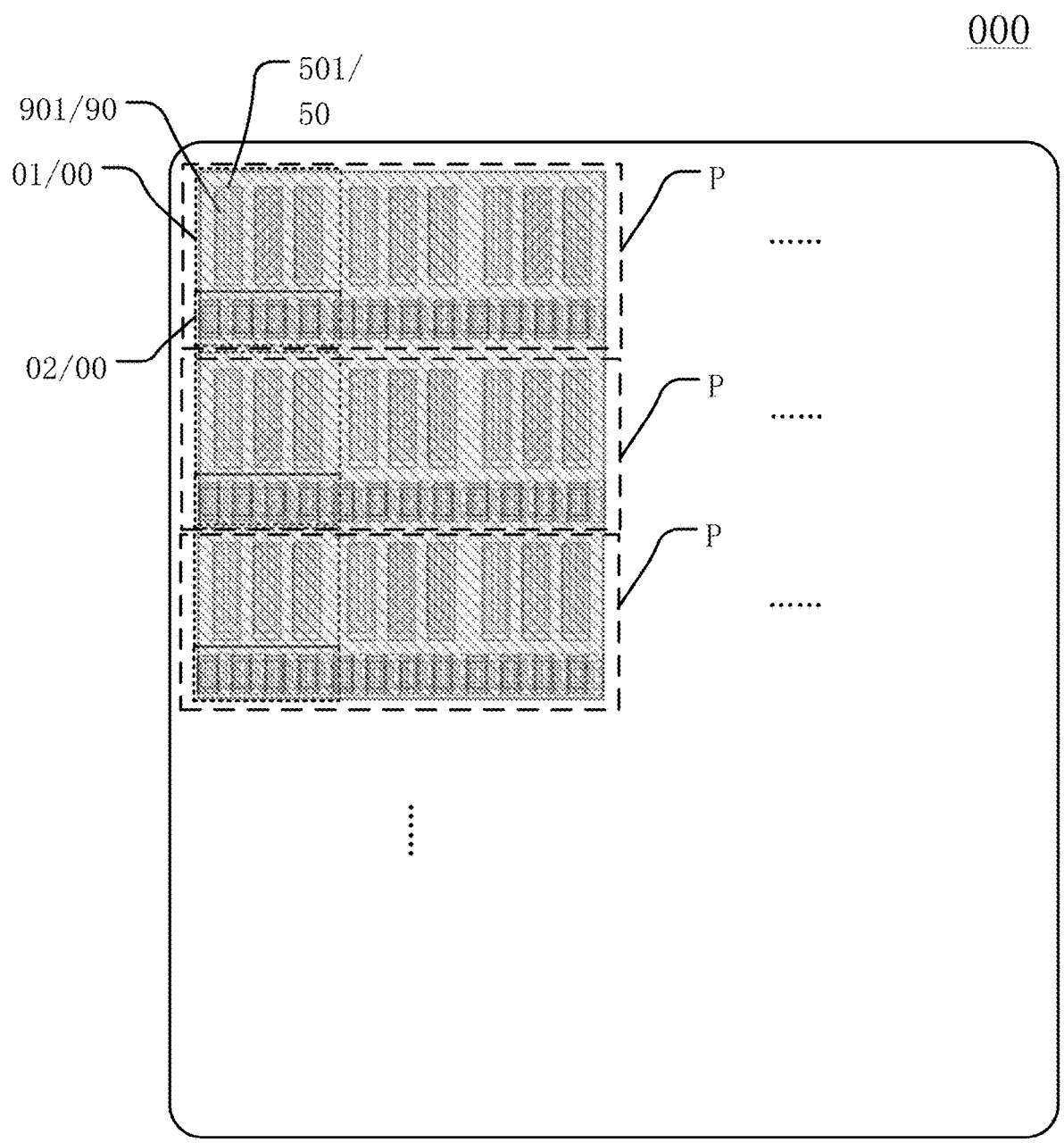
FIG. 42 illustrates a plan structural schematic of an exemplary display panel according to various embodiments of the present disclosure.
Figure 43:
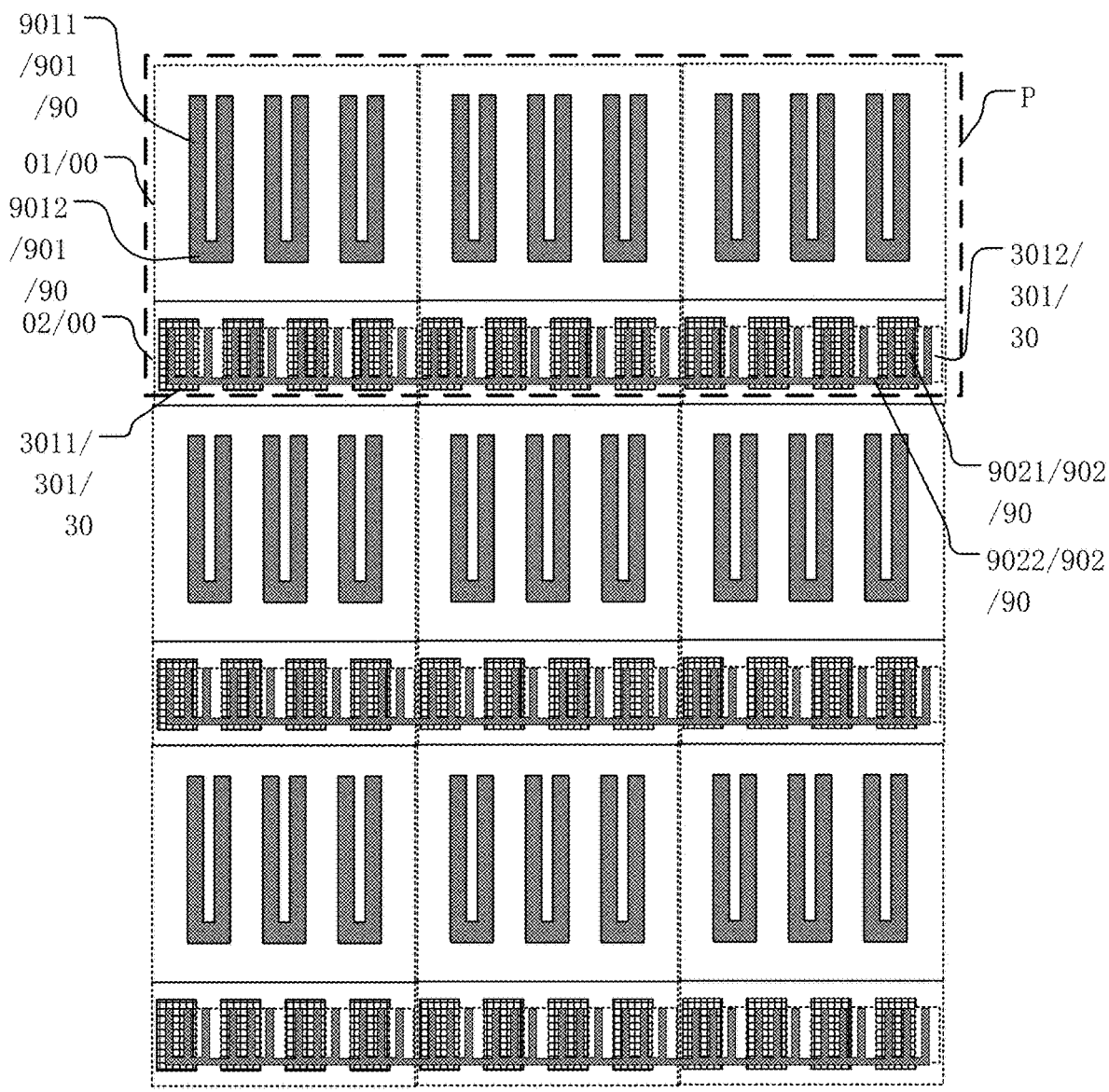
FIG. 43 illustrates a structural schematic of a side view of the first substrate facing the second substrate in FIG. 42.

In some optional embodiments, referring to FIGS. 42-43, FIG. 42 illustrates a plan structural schematic of an exemplary display panel according to various embodiments of the present disclosure; and FIG. 43 illustrates a structural schematic of a side view of the first substrate facing the second substrate in FIG. 42 (it can be understood that to clearly illustrate the structure in one embodiment, transparency fill may be performed in FIG. 42). In one embodiment, the display panel 000 may include a plurality of sub-regions P; and the sub-region P may include at least two pixel units 00.

In the sub-region P, the second pixel electrodes 902 of different highlighted pixel regions 02 may be connected to each other.

In one embodiment, it may describe that the entire region of the display panel 000 may be divided into a plurality of sub-regions P; and the range of one sub-region P may include at least two pixel units 00. In one embodiment, the range of one sub-region P may include three pixel units 00 as an example for illustration in FIGS. 42-43, which may include, but not be limited to, such number, and may be selected and configured according to actual needs. In one sub-region P of one embodiment, the second pixel electrodes 902 of the highlighted pixel regions 02 in different pixel units 00 may be connected to each other. That is, the highlight pixel regions 02 within the range of one sub-region P may jointly control whether to emit light to realize the anti-peep function at the oblique viewing angle. For example, when the display content of a certain sub-region P or sub-regions P in the display panel 000 belongs to important privacy content and the display content of remaining sub-regions P does not belong to privacy content, the highlighted pixel regions 02 of the sub-region P or sub-regions P may be individually turned on to emit light. In such way, the sub-region P or sub-regions P may emit white light in the oblique viewing angle to have the on-state anti-peep function in the oblique viewing angle. In one embodiment, the display panel 000 may be configured as the plurality of sub-regions P, the highlighted pixel regions 02 in different sub-regions P may be controlled separately, and the anti-peep function of the display panel 000 may be realized in different regions, which may be beneficial for reducing power consumption.

In some optional embodiments, referring to FIGS. 27-30, the color pixel region 01 may include a plurality of color sub-pixels 011 in one embodiment; and the plurality of color sub-pixels 011 in one color pixel region 01 may include a red sub-pixel, a green sub-pixel, and a blue sub-pixel. Optionally, the color-resist of the color-resist layer 50 corresponding to the red sub-pixel is a red color-resist, the color-resist of the color-resist layer 50 corresponding to the green sub-pixel is a green color-resist, and the color-resist of the color-resist layer 50 corresponding to the blue sub-pixel is a blue color-resist, thereby implementing the color display picture of the color pixel region 01. The highlighted pixel region 02 may include a plurality of highlighted sub-pixels 021; and the highlighted sub-pixel 021 may include any one of a white sub-pixel or a yellow sub-pixel. Optionally, the color-resist of the color-resist layer 50 corresponding to the white sub-pixel is a white color-resist, and the color-resist of the color-resist layer 50 corresponding to the yellow sub-pixel is a yellow color-resist. When the white color-resist or yellow color-resist corresponding to the highlighted sub-pixel 021 is made of an organic material, due to the property limitation of the material itself, obtained white color-resist may not ensure to be pure white or may be light yellow. Therefore, white color-resist and yellow color-resist may also be understood as highlighted color-resists. The second opening 4012 of the highlighted color-resist and the structure on the side of the first substrate 10 form the highlighted sub-pixel 021, so that the highlighted white light of the highlighted sub-pixel 021 may leak light at the oblique viewing angle, thereby implementing the on-state anti-peep effect.

Figure 44:
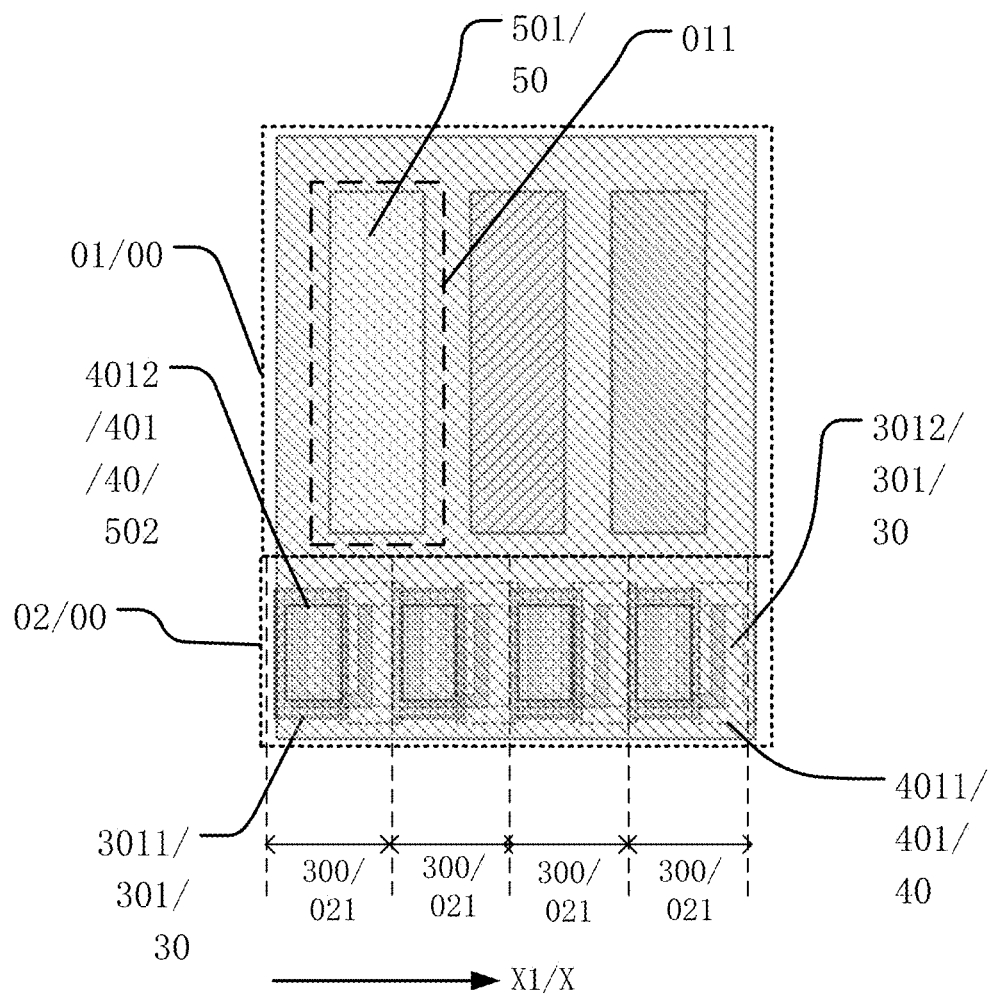
FIG. 44 illustrates another plan structural schematic of an exemplary pixel unit according to various embodiments of the present disclosure.

In some optional embodiments, referring to FIG. 44, FIG. 44 illustrates a plan structural schematic of an exemplary pixel unit according to various embodiments of the present disclosure (it can be understood that to clearly illustrate the structure in one embodiment, transparency fill may be performed in FIG. 44). In one embodiment, in the color pixel region 01, the plurality of color sub-pixels 011 may be arranged along the first direction X1; in the highlighted pixel region 02, the plurality of highlighted sub-pixels 021 may be arranged along the first direction X1, where the first direction X1 is a direction in parallel with the plane direction X where the first substrate 10 is located.

In one embodiment, it may describe that the arrangement direction of the plurality of color sub-pixels 011 in the color pixel region 01 may be same as the arrangement direction of the plurality of highlighted sub-pixels 021 in the highlighted pixel region 02. As shown in FIG. 44, the plurality of color sub-pixels 011 may be arranged along the first direction X1, and the plurality of highlighted sub-pixels 021 may also be arranged along the first direction X1, thereby implementing the arrangement manner of the highlighted sub-pixels 021.

Figure 45:
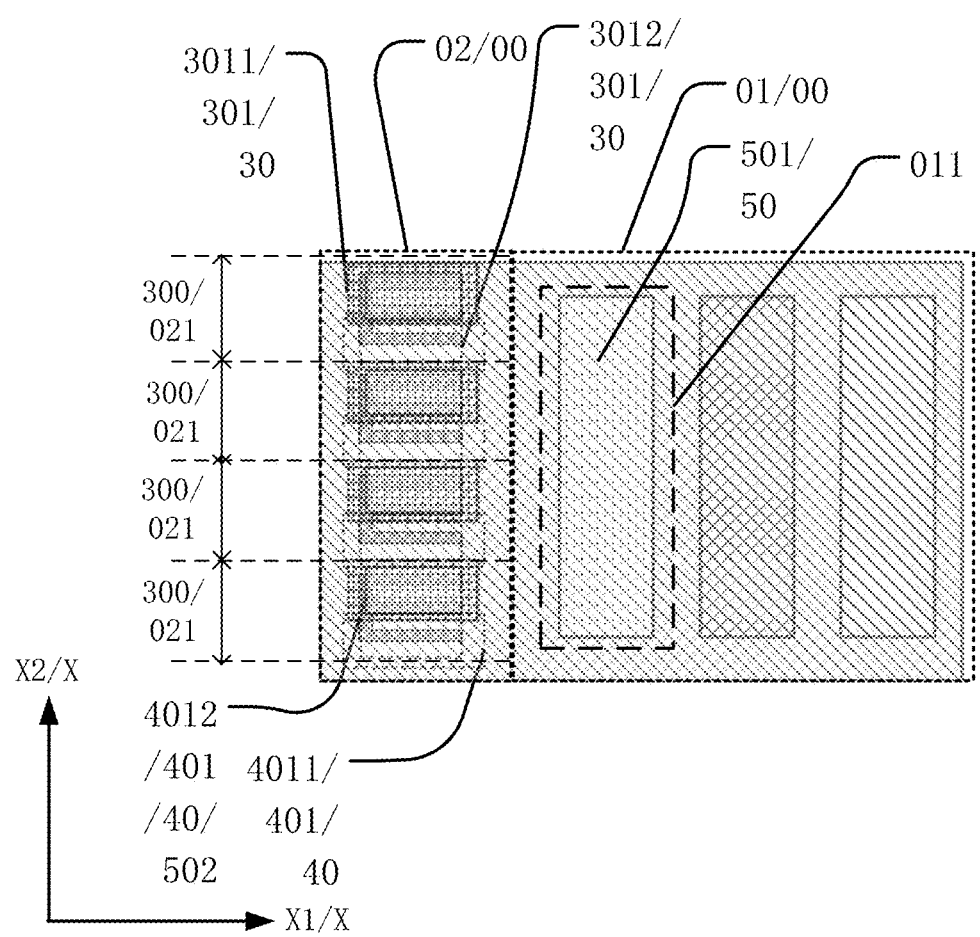
FIG. 45 illustrates another plan structural schematic of an exemplary pixel unit according to various embodiments of the present disclosure.

Optionally, referring to FIG. 45, FIG. 45 illustrates a plan structural schematic of an exemplary pixel unit according to various embodiments of the present disclosure (it can be understood that to clearly illustrate the structure in one embodiment, transparency fill may be performed in FIG. 45). In one embodiment, in the color pixel region 01, the plurality of color sub-pixels 011 may be arranged along the first direction X1; in the highlighted pixel region 02, the plurality of highlighted sub-pixels 021 may be arranged along the second direction X2, where along the direction X in parallel with the plane where the first substrate 10 is located, the first direction X1 may intersect the second direction X2.

In one embodiment, it may describe that the arrangement direction of the plurality of color sub-pixels 011 in the color pixel region 01 may be different from the arrangement direction of the plurality of highlighted sub-pixels 021 in the highlighted pixel region 02. Optionally, the arrangement direction of the plurality of color sub-pixels 011 in the color pixel region 01 may intersect or be perpendicular to the arrangement direction of the plurality of highlighted sub-pixels 021 in the highlighted pixel region 02 (as shown in FIG. 45). The plurality of color sub-pixels 011 may be arranged along the first direction X1, and the plurality of highlighted sub-pixels 021 may be arranged along the second direction X2, where along the direction X in parallel with the plane of the first substrate 10, the first direction X1 may intersect or be perpendicular to the second direction X2, thereby implementing another arrangement manner of the highlighted sub-pixels 021.

It can be understood that the arrangement direction of the plurality of color sub-pixels 011 in the color pixel region 01 and the arrangement direction of the plurality of highlighted sub-pixels 021 in the highlighted pixel region 02 may not be limited in one embodiment. Above-mentioned two arrangements are acceptable, which may only need to satisfy that the highlighted pixel region 02 can achieve the on-state anti-peep effect at the oblique viewing angle.

In some optional embodiments, referring to FIGS. 1-4, the area of the orthographic projection of one pixel unit 00 onto the first substrate 10 is S1; and in one pixel unit 00, the area of the orthographic projection of the highlighted pixel region 02 onto the first substrate is S2, where S2≤0.5×S1.

In one embodiment, it may describe that, in one pixel unit 00 of the display panel 000, the area occupied by the highlighted pixel region 02 may normally not be greater than half of the area of the entire pixel unit 00. That is, if the area of the orthographic projection of one pixel unit 00 onto the first substrate 10 is S1, then the area of the orthographic projection of the highlighted pixel region 02 onto the first substrate in one pixel unit 00 S2≤0.5×S1. S2<0.5×S1 is taken as an example for illustration in FIGS. 1-4. In one embodiment, the area occupied by the highlighted pixel region 02 in one pixel unit 00 may be limited. Therefore, it may avoid that when the area of the highlighted pixel region 02 in one pixel unit 00 is greater than half of the area of the entire pixel unit 00, the occupied space of the highlighted pixel region 02 is excessively large, resulting in an excessively small area of the color pixel region 01, which may affect the display effect of the display panel 000 at the front viewing angle.

Figure 46:
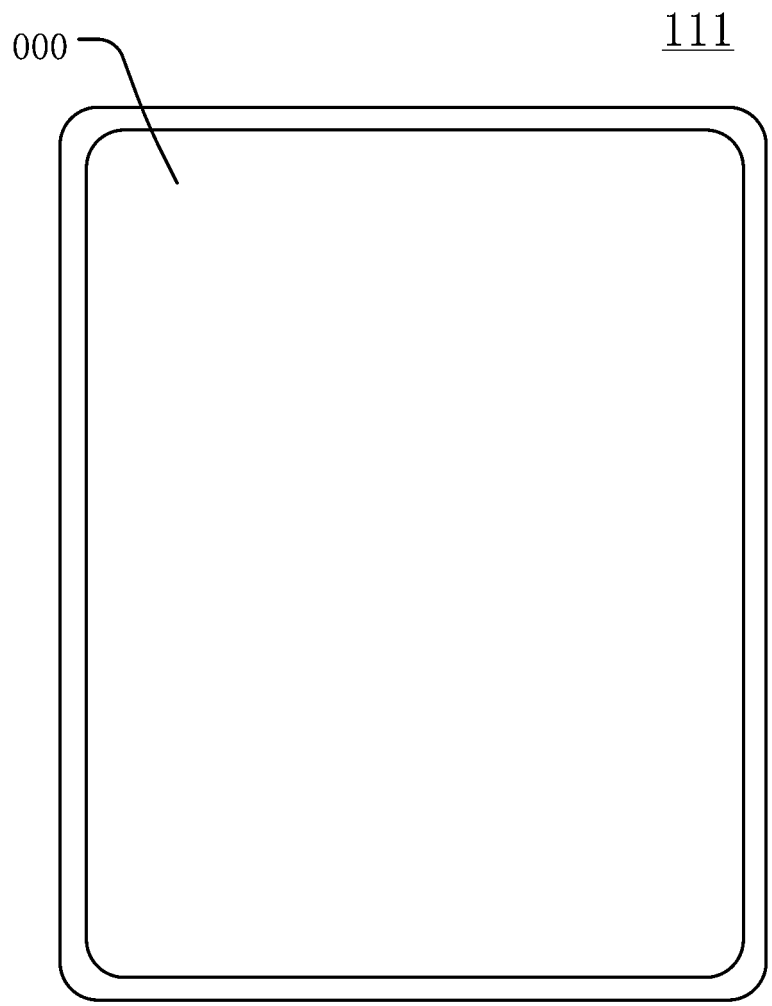
FIG. 46 illustrates a plan structural schematic of an exemplary display apparatus according to various embodiments of the present disclosure.

In some optional embodiments, referring to FIG. 46, FIG. 46 illustrates a plan structural schematic of an exemplary display apparatus according to various embodiments of the present disclosure. A display apparatus 111 provided in one embodiment may include the display panel 000 provided by above-mentioned embodiments of the present disclosure. A mobile phone may be taken as an example to describe the display apparatus 111 in FIG. 46. It can be understood that the display apparatus 111 provided in embodiments of the present disclosure may also be a computer, a TV, a vehicle-mounted display device, and other display devices 1000 having a display function, which may not be limited according to various embodiments of the present disclosure. The display apparatus 111 provided by embodiments of the present disclosure may have the beneficial effects of the display panel provided by embodiments of the present disclosure, which may refer to the description of the display panel in above-mentioned embodiments and may not be described in detail according to various embodiments of the present disclosure.

From the above-mentioned embodiments, it may be seen that the display panel and the display apparatus provided by the present disclosure may achieve at least the following beneficial effects.

The display panel provided in the present disclosure may include the plurality of pixel units. One pixel unit may include at least one color pixel region and one highlighted pixel region, where the color pixel region may be used for the display panel to realize color picture display. In the range of the highlighted pixel region, the first light-blocking layer on the side of the substrate of the display panel may include the first light-blocking portion. The first light-blocking portion may at least include one first opening and one first sub-portion. The first opening may be understood as a hollow structure formed on the first light-blocking layer. The first opening may pass through the first light-blocking layer along the direction perpendicular to the light-exiting surface of the display panel. The first sub-portion may be understood as a portion of the first light-blocking layer having insulating and light-blocking material. The second light-blocking layer on the side of the second substrate of the display panel may include the second light-blocking portion. The second light-blocking portion may at least include one second sub-portion and one second opening. The second opening may be understood as a hollow structure formed on the second light-blocking layer, and the second opening may pass through the second light-blocking layer along the direction perpendicular to the light-exiting surface of the display panel. The second sub-portion may be understood as a portion of the second light-blocking layer having insulating and light-blocking material. When the user views the display panel at the light-exiting surface side of the display panel, if it is viewed within the front viewing angle range, the second opening formed on the side of the second substrate is blocked by the first sub-portion which is below the second opening and on the side of the first substrate; and the first opening formed on the side of the first substrate is blocked by the second sub-portion which is above the first opening and on the side of the second substrate. Therefore, the light may not transmit the highlighted pixel region, and the color pixel region may display picture normally. If the user views the display panel within the range of the oblique viewing angle, oblique light leakage may occur within the range of the highlighted pixel region; and since the highlighted pixel region has high brightness and high transmittance, the viewer may view white pictures at an oblique direction, such that the display panel may be in the on-state when being viewed from the oblique viewing angle, thereby implementing the anti-peep function. In the present disclosure, only a part of the pixel unit may be configured as the highlighted pixel region, and the first light-blocking layer on the side of the first substrate and the second light-blocking layer on the side of the second substrate may be cooperatively arranged, which may implement the objective of being able to watch normal display pictures at the front viewing angle and have the on-state anti-peep function at the oblique viewing angle. The display panel provided in one embodiment may not need to be provided with an anti-peep film or other anti-peep structures to realize the anti-peep function from the oblique viewing angle. Therefore, when the pictures are displayed normally, the brightness loss may be small, which may be beneficial for improving the display quality and user satisfaction.

Although some embodiments of the present disclosure have been described in detail through examples, those skilled in the art should understand that above-mentioned examples are provided for illustration only and not for the purpose of limiting the scope of the disclosure. Those skilled in the art should understand that modifications may be made to above-mentioned embodiments without departing from the scope and spirit of the present disclosure. The scope of the present disclosure may be defined by appended claims.

What is claimed is:

1. A display panel, comprising:
a plurality of pixel units, wherein a pixel unit of the plurality of pixel units at least includes a color pixel region and a highlighted pixel region; and
a first substrate and a second substrate, which are oppositely disposed, wherein:
a side of the first substrate facing the second substrate includes a first light-blocking layer, and a side of the second substrate facing the first substrate includes a second light-blocking layer and a color-resist layer;
in the highlighted pixel region, the first light-blocking layer includes a first light-blocking portion at least including a first opening and a first sub-portion; and the second light-blocking layer includes a second light-blocking portion at least including a second sub-portion and a second opening, wherein the highlighted pixel region in the pixel unit further includes a plurality of highlighted sub-pixels directly adjacent to one another by sharing a sub-pixel boundary line and aligned in a single row, wherein, within a range of each highlighted sub-pixel, the side of the first substrate facing the second substrate includes a corresponding first sub-portion and a corresponding first opening and the side of the second substrate facing the first substrate includes a corresponding second sub-portion and a corresponding second opening, and wherein two second sub-portions of two highlighted sub-pixels next to each other are separated by one second opening; and
an orthographic projection of the second opening onto the first substrate overlaps an orthographic projection of the first sub-portion onto the first substrate; and an orthographic projection of the first opening onto the first substrate overlaps an orthographic projection of the second sub-portion onto the first substrate.

2. The display panel according to claim 1, wherein:
the orthographic projection of the second opening onto the first substrate is within a range of the orthographic projection of the first sub-portion onto the first substrate; and the orthographic projection of the first opening onto the first substrate is within a range of the orthographic projection of the second sub-portion onto the first substrate.

3. The display panel according to claim 1, wherein:
the first light-blocking portion includes one first opening and two first sub-portions; and along a direction in parallel with a plane of the first substrate, one first opening is between the two first sub-portions which are adjacent to each other; and
the second light-blocking portion includes one second sub-portion and two second openings; and along the direction in parallel with the plane of the first substrate, one second sub-portion is between the two second openings which are adjacent to each other.

4. The display panel according to claim 1, wherein:
the color-resist layer includes a color color-resist and a light-transmitting portion, the color color-resist is in the color pixel region, the light-transmitting portion is in the highlighted pixel region, and a transmittance of the light-transmitting portion is greater than a transmittance of the color color-resist.

5. The display panel according to claim 4, wherein:
in the color pixel region, the second light-blocking layer further includes a third light-blocking portion; the third light-blocking portion includes a plurality of third openings; and the color color-resist is disposed in a third opening of the plurality of third openings.

6. The display panel according to claim 5, wherein:
the second light-blocking portion is connected to the third light-blocking portion.

7. The display panel according to claim 1, wherein:
the side of the first substrate facing the second substrate further includes a thin film transistor array layer, a planarization layer, and a pixel electrode layer, wherein the thin film transistor array layer is on a side of the first substrate, the planarization layer is on a side of the thin film transistor array layer away from the first substrate, and the pixel electrode layer is on the side of the thin film transistor array layer away from the first substrate; and
the pixel electrode layer includes a first pixel electrode and a second pixel electrode, wherein the first pixel electrode is in the color pixel region, and the second pixel electrode is in the highlighted pixel region.

8. The display panel according to claim 7, wherein:
an orthographic projection of the second pixel electrode onto the first substrate overlaps the orthographic projection of the first opening onto the first substrate.

9. The display panel according to claim 8, wherein:
the orthographic projection of the second pixel electrode onto the first substrate is in a range of the orthographic projection of the first opening onto the first substrate.

10. The display panel according to claim 7, wherein:
the first light-blocking layer is on a side of the pixel electrode layer away from the first substrate.

11. The display panel according to claim 7, wherein:
the first light-blocking layer is on a side of the planarization layer adjacent to the first substrate.

12. The display panel according to claim 7, wherein:
the highlighted pixel region further includes a plurality of second pixel electrodes; and a second pixel electrode of the plurality of second pixel electrodes corresponds to a highlighted sub-pixel of the plurality of highlighted sub-pixels.

13. The display panel according to claim 12, wherein:
at least two second pixel electrodes in the highlighted pixel region are connected to each other.

14. The display panel according to claim 7, wherein:
the first pixel electrode is a comb-shaped structure and includes at least two strip-shaped first sub-portions and one first connecting portion; and ends of the first sub-portions are connected to each other through the first connecting portion; and
the second pixel electrode is a comb-shaped structure and includes at least two strip-shaped second sub-portions and one second connecting portion; and ends of the second sub-portions are connected to each other through the second connecting portion.

15. The display panel according to claim 14, wherein:
along a direction in parallel with a plane of the first substrate, a length extension direction of a first sub-portion is same as a length extension direction of a second sub-portion.

16. The display panel according to claim 14, wherein:
along a direction in parallel with a plane of the first substrate, a length extension direction of a first sub-portion intersects a length extension direction of a second sub-portion.

17. The display panel according to claim 7, wherein:
second pixel electrodes at different highlighted pixel regions are independent from each other.

18. The display panel according to claim 7, wherein:
second pixel electrodes at different highlighted pixel regions are connected to each other.

19. The display panel according to claim 7, further including:
a plurality of sub-regions, wherein:
a sub-region of the plurality of sub-regions includes at least two pixel units; and
in the sub-region, second pixel electrodes at different highlighted pixel regions are connected to each other.

20. A display apparatus, comprising:
a display panel, comprising:
a plurality of pixel units, wherein a pixel unit of the plurality of pixel units at least includes a color pixel region and a highlighted pixel region; and
a first substrate and a second substrate, which are oppositely disposed, wherein:
a side of the first substrate facing the second substrate includes a first light-blocking layer, and a side of the second substrate facing the first substrate includes a second light-blocking layer and a color-resist layer;
in the highlighted pixel region, the first light-blocking layer includes a first light-blocking portion at least including a first opening and a first sub-portion; and the second light-blocking layer includes a second light-blocking portion at least including a second sub-portion and a second opening, wherein the highlighted pixel region in the pixel unit further includes a plurality of highlighted sub-pixels directly adjacent to one another by sharing a sub-pixel boundary line and aligned in a single row, wherein, within a range of each highlighted sub-pixel, the side of the first substrate facing the second substrate includes a corresponding first sub-portion and a corresponding first opening and the side of the second substrate facing the first substrate includes a corresponding second sub-portion and a corresponding second opening, and wherein two second sub-portions of two highlighted sub-pixels next to each other are separated by one second opening; and an orthographic projection of the second opening onto the first substrate overlaps an orthographic projection of the first sub-portion onto the first substrate; and an orthographic projection of the first opening onto the first substrate overlaps an orthographic projection of the second sub-portion onto the first substrate.

\* \* \* \* \*